United States Patent
Smith et al.

(10) Patent No.: US 9,703,041 B2
(45) Date of Patent: Jul. 11, 2017

(54) MULTI-CHANNEL OPTICAL CONNECTOR WITH COUPLING LENSES

(71) Applicant: 3M INNOVATIVE PROPERTIES COMPANY, St. Paul, MN (US)

(72) Inventors: Terry L. Smith, Roseville, MN (US); Michael A. Haase, St. Paul, MN (US); Alexander R. Mathews, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/432,988

(22) PCT Filed: Dec. 2, 2013

(86) PCT No.: PCT/US2013/072599
§ 371 (c)(1),
(2) Date: Apr. 1, 2015

(87) PCT Pub. No.: WO2014/093046
PCT Pub. Date: Jun. 19, 2014

(65) Prior Publication Data
US 2015/0301295 A1    Oct. 22, 2015

Related U.S. Application Data

(60) Provisional application No. 61/736,703, filed on Dec. 13, 2012.

(51) Int. Cl.
G02B 6/26     (2006.01)
G02B 6/42     (2006.01)
(Continued)

(52) U.S. Cl.
CPC .............. *G02B 6/264* (2013.01); *G02B 6/32* (2013.01); *G02B 6/34* (2013.01); *G02B 6/4214* (2013.01);
(Continued)

(58) Field of Classification Search
CPC . G02B 6/26; G02B 6/264; G02B 6/32; G02B 6/34; G02B 6/40; G02B 6/4204; G02B 6/4214; G02B 6/3885
(Continued)

(56) References Cited

U.S. PATENT DOCUMENTS 6,956,995 B1 * 10/2005 Shafaat .................... G02B 6/32
                                                       385/33
7,066,657 B2     6/2006 Murali
(Continued)

FOREIGN PATENT DOCUMENTS

BE    EP 2031427 A1 *  3/2009  ............... G02B 6/42
DE    10 2011 081684        4/2012
(Continued)

OTHER PUBLICATIONS

International search report for PCT International Application No. PCT/US2013/072599 mailed on Mar. 21, 2014, 4 pages.

*Primary Examiner* — Robert Tavlykaev
(74) *Attorney, Agent, or Firm* — Clifton F. Richardson; Robert S. Moshrefzadeh

(57) ABSTRACT

Optical connectors are provided for connecting sets of optical waveguides (110), such as optical fiber ribbons to each other, to printed circuit boards, or to backplanes. The provided connectors include a waveguide alignment member (105) for receiving and aligning a plurality of optical waveguides (110) such that central light rays of light exiting the plurality of optical waveguides propagate along a same incident direction (115) in a same incident plane XY. The
(Continued)

optical connectors also include a light redirecting side that comprises a plurality of segments (130) forming a row of segments (130a, 130b, . . . ), each segment corresponding to a different optical waveguide. A first segment (130a) redirects light along a first redirected direction (140a) and a second segment (130b) redirects light along a second redirected direction (140b) different from the first redirected direction. Other segments redirect light to either a first redirected direction or a second redirected direction. The light is redirected to two or more rows of optical lenses (150). Also provided is a cable assembly that includes a provided connector and a plurality of optical waveguides permanently attached to the connector.

21 Claims, 14 Drawing Sheets

(51) Int. Cl.
  *G02B 6/32* (2006.01)
  *G02B 6/34* (2006.01)
  *G02B 6/36* (2006.01)
  *G02B 6/43* (2006.01)

(52) U.S. Cl.
  CPC ............ *G02B 6/3652* (2013.01); *G02B 6/425* (2013.01); *G02B 6/4292* (2013.01); *G02B 6/43* (2013.01)

(58) Field of Classification Search
  USPC .............. 385/31, 33–36, 47, 88, 89, 92, 93
  See application file for complete search history.

(56) References Cited

U.S. PATENT DOCUMENTS

| | | |
|---|---|---|
| 7,295,727 B1 | 11/2007 | Thorson |
| 7,366,380 B1* | 4/2008 | Peterson .............. G02B 6/4214 385/47 |
| 7,379,639 B2* | 5/2008 | Ozawa ................. G02B 6/4204 385/33 |
| 7,473,038 B2 | 1/2009 | Fujiwara |
| 7,534,052 B2 | 5/2009 | Fujiwara |
| 7,726,885 B2 | 6/2010 | Nishimura |
| 8,165,432 B2 | 4/2012 | Ohta |
| 8,620,122 B2 | 12/2013 | Meadowcroft |
| 9,052,478 B2* | 6/2015 | Charbonneau-Lefort ................ G02B 6/4214 |
| 9,140,866 B2* | 9/2015 | Lee ........................... G02B 6/43 |
| 2005/0089268 A1* | 4/2005 | Chen .................... G02B 6/4249 385/24 |
| 2006/0239605 A1* | 10/2006 | Palen ................... G02B 6/4206 385/14 |
| 2009/0116793 A1* | 5/2009 | Nishimura ........... G02B 6/3885 385/78 |
| 2010/0135618 A1 | 6/2010 | Howard |
| 2010/0215313 A1* | 8/2010 | Matsuoka ................ G02B 6/43 385/14 |
| 2011/0317959 A1 | 12/2011 | Ohta |
| 2014/0193124 A1* | 7/2014 | Bylander .............. G02B 6/4214 385/93 |

FOREIGN PATENT DOCUMENTS

| | | | |
|---|---|---|---|
| JP | WO 2011/087081 A1 * | 7/2011 | .............. G02B 6/42 |
| WO | WO 2013-048730 | 4/2013 | |
| WO | WO 2013-048743 | 4/2013 | |
| WO | WO 2013-180943 | 12/2013 | |
| WO | WO 2014-055226 | 4/2014 | |
| WO | WO 2014-055361 | 4/2014 | |

* cited by examiner

MULTI-CHANNEL OPTICAL CONNECTOR WITH COUPLING LENSES

TECHNICAL FIELD

The provided disclosure relates to optical connectors for connecting sets of optical waveguides such as optical fiber ribbons.

BACKGROUND

Optical fiber connectors can be used to connect optical fibers in a variety of applications including: telecommunications networks, local area networks, data center links, and for internal links in high performance computers. These connectors can be grouped into single fiber and multiple fiber designs and also grouped by the type of contact. Common contact methods include: physical contact wherein the mating fiber tips are polished to a smooth finish and pressed together; index matched, wherein a compliant material with an index of refraction that is matched to the core of the fiber fills a small gap between the mated fibers' tips; and air gap connectors, wherein the light passes through a small air gap between the two fiber tips. With each of these contact methods a small bit of dust on the tips of the mated fibers can greatly increase the light loss.

Another type of optical connector is referred to as an expanded beam connector. This type of connector allows the light beam in the source connector to exit the fiber core and diverge within the connector for a short distance before the light is collimated to form a beam with a diameter substantially greater than the core. In the receiving connector the beam is then focused back to its original diameter on the tip of the receiving fiber. This type of connector is less sensitive to dust and other forms of contamination that may be present in the region where the beam is expanded to the larger diameter.

Backplane optical connectors will become essential components of high-performance computers, data centers, and telecom switching systems in the near future, as line rates of data transmission migrate from the current 10 Gb/sec/line to 25 Gb/sec/line in the next few years. It would be advantageous to provide expanded beam connectors that are lower cost and higher performance alternatives to existing optical and copper connections that are currently being used in the 10 Gb/sec interconnects.

SUMMARY

The provided disclosure relates to optical connectors for connecting sets of optical waveguides, such as optical fiber ribbons, to waveguides disposed on printed circuit boards or backplanes. In particular, the provided connectors utilize expanded beam optics with non-contact optical mating resulting in relaxed mechanical precision requirements, thus enabling low-cost injection molding and improved resistance to dirt and damage. The provided connectors can have low optical loss, can be easily scalable to high channel count (optical fibers per connector), can provide safety to the user, and can be compatible with low insertion force blind mating. The provided connectors have suitability for use for backplane, front-plane, or mid-span connections.

In one aspect a connector is provided that includes a waveguide alignment member for receiving and aligning a plurality of optical waveguides, such that central light rays of light exiting the plurality of optical waveguides propagate along a same incident direction in a same incident plane; a light redirecting side comprising a plurality of segments forming a row of segments, the row being parallel to the incident plane, each segment corresponding to a different optical waveguide disposed and aligned at the waveguide alignment member and configured to receive light exiting the optical waveguide along the incident direction and redirect the received light along a redirected direction different from the incident direction, a first segment redirecting light along a first redirected direction, a second segment redirecting light along a second redirected direction different from the first redirected direction; and a plurality of optical lenses forming two or more rows of optical lenses, each optical lens in the plurality of optical lenses corresponding to a different segment in the plurality of segments and configured to receive light from the segment along a corresponding redirected direction and transmit the received light as output light along an output direction, a divergence of the output light being different than a divergence of the light received by the optical lens.

In some embodiments, a provided connector can further include a light redirecting member that includes an input side for receiving incident light from an optical waveguide disposed and aligned at the waveguide alignment member along the incident direction and transmitting the received light as input light along an input direction, the light redirecting side for receiving light from the input side along the input direction and redirecting the received light along the redirected direction, an output side for receiving light from the light redirecting side and transmitting the received light as the output light, and the plurality of optical lenses. In some embodiments, a cable assembly is provided that includes a provided connector and a plurality of optical waveguides received and aligned at the waveguide alignment member. The optical waveguides are permanently attached to the connector.

In some embodiments, the provided connector can further include a plurality of light redirecting elements, each light redirecting element corresponding to a different segment in the plurality of segments and to a different optical lens in the plurality of optical lenses. The light redirecting elements can include an input side for receiving an incident light from an optical waveguide disposed and aligned at the waveguide alignment member along the incident direction and transmitting the received light as input light along an input direction, the segment corresponding to the light redirecting element for receiving light from the input side along the input direction and redirecting the received light along the redirected direction, an output side for receiving light from the segment and transmitting the received light as the output light, and the optical lens corresponding to the segment and the light redirecting element.

In another aspect, a connector assembly is provided that includes a first provided connector and a second provided connector. Each optical waveguide in one connector corresponds to a different optical waveguide in the other connector, each optical lens in one connector corresponds to a different optical lens in the other connector, such that light exiting an optical waveguide in one connector enters the corresponding optical waveguide in the other connector after being redirected by the corresponding segment in the connector toward the corresponding optical lens in the connector, being transmitted by the corresponding optical lens in the connector toward the corresponding optical lens in the other connector, being transmitted by the optical lens in the other connector toward the corresponding segment in the other connector, and being redirected by the corresponding segment in the other connector toward the corresponding optical waveguide in the other connector.

In yet another aspect, a connector is provided that includes a unitary light redirecting side configured to receive central light rays exiting a plurality of optical waveguides along a same incident direction in a same plane. The unitary light redirecting side includes a plurality of segments forming a row of segments, the row being parallel to the plane, each segment corresponding to a different optical waveguide and configured to receive light exiting the optical waveguide along the incident direction and redirect the received light along a redirected direction different than the incident direction, at least one first redirected direction making an oblique angle with at least one second redirected direction.

In another aspect, a light redirecting member is provided that has a unitary structure and includes a light input side through which light enters the light redirecting member, a light redirecting side for redirecting the entered light, and a light output side through which the redirected light exits the light redirecting member, the light redirecting side comprising first and second segments arranged along a first direction, the light output side comprising first and second optical lenses offset relative to each other along at least a second direction perpendicular to the first direction, the unitary light redirecting member being configured so that light redirected by the first and second segments exits the light redirecting member after propagating through the first and second optical lenses, respectively.

In another aspect, a connector is provided that includes a waveguide alignment member for receiving and aligning a plurality of optical waveguides and a light redirecting member. The light redirecting member includes an input side for receiving a central light ray exiting an optical waveguide disposed and aligned at the waveguide alignment member along an incident direction and transmitting the received central light ray as input light along an input direction, a light redirecting side for receiving the input light along the input direction and redirecting the received light as redirected light along a redirected direction different than the input direction, and a plurality of optical lenses, each optical lens in the plurality of optical lenses corresponding to a different optical waveguide disposed and aligned at the waveguide alignment member and configured to receive the redirected light corresponding to the optical waveguide and transmit the received light as output light along a same output direction, such that the light redirecting side redirects light received from first and second optical waveguides disposed and aligned at the waveguide alignment member as respective first and second redirected lights along respective first and second redirected directions, the first redirected direction being different than the second redirected direction.

In another aspect, a structured surface is provided that has a unitary construction comprising a plurality of optical lenses. The plurality of optical lenses can cover at least 70% of the structured surface. A central light ray of a first collimated light incident on a first optical lens in the plurality of optical lenses along an incident direction can be deflected by the first optical lens along a first direction and a central light ray of a second collimated light incident on a different second optical lens in the plurality of optical lenses along the incident direction can be deflected by the second optical lens along a second direction different than the first direction. Also provided is a structured surface having a unitary construction and comprising a plurality of optical lenses covering at least 70% of the structured surface.

In another aspect, a connector includes a waveguide alignment member for receiving and aligning a plurality of optical waveguides, such that central light rays of light exiting the plurality of optical waveguides propagate along at least two different first and second incident directions. The connector also includes a light redirecting side that is configured to receive light exiting an optical waveguide disposed and aligned at the waveguide alignment member along an incident direction and to redirect the received light along a redirected direction different from the incident direction. The connector also includes a plurality of optical lenses forming two or more rows of optical lenses. Each optical lens in the plurality of optical lenses corresponds to a different optical waveguide in a plurality of optical waveguides disposed and aligned at the waveguide alignment member and is configured to receive light exiting the optical waveguide and redirected by the light redirecting side and transmit the received light as output light along an output direction, where a divergence of the output light is different that a divergence of the light received by the optical lens. In some cases, each optical lens in the plurality of optical lenses corresponds to a different optical waveguide in a plurality of optical waveguides disposed and aligned at the waveguide alignment member and is configured to receive light exiting the optical waveguide and redirected by the light redirecting side and transmit the received light as output light along the same output direction. In some cases, the light redirecting side is planar. In some cases, the light redirecting side is configured to receive light exiting an optical waveguide disposed and aligned at the waveguide alignment member along the first incident direction and to redirect the received light along a first redirected direction different from the first incident direction, and to receive light exiting an optical waveguide disposed and aligned at the waveguide alignment member along the second incident direction and to redirect the received light along a second redirected direction different from the second incident direction, where the first and second redirecting directions are the same.

The provided optical connectors can be used for connecting sets of optical waveguides utilizing expanded beam optics with non-contact mating that can result in relaxed mechanical fabrication requirements. This can, in turn, enable the use of processes such as low-cost injection molding and can result in connectors that have improved resistance to dirt and contamination. The provided connectors can have low optical loss, typically less than 1.0 dB per mated connector pair. Additionally, the provided connector can be easily and economically scaled to have 256 or more connected optical waveguides. The provided connectors have a low insertion force, blind mating and are suitable for high speed backplane, front-plane, or mid-span connections.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
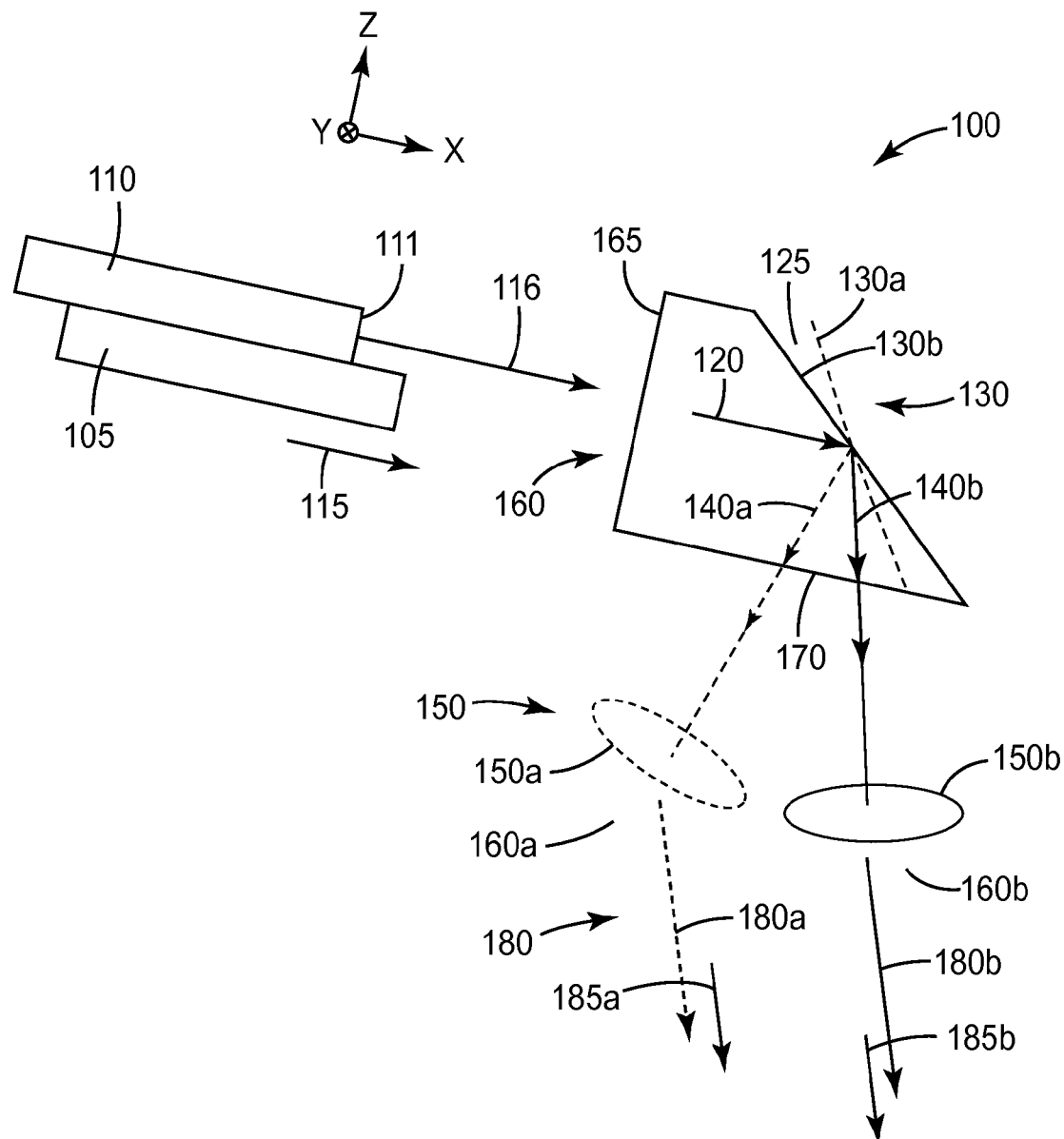
FIG. 1a is a schematic illustration of an embodiment of a provided connector.

The optical cables used in many applications make use of fiber ribbons. These ribbons are comprised of a set of coated fibers joined together in a line (typically 4, 8 or 12 fibers in a line). The individual glass fibers with their protective coatings are typically 250 microns in diameter and the ribbons typically have a fiber to fiber pitch of 250 microns. This 250 micron spacing has also been used in optical transceivers with a variety of designs spacing the active optical devices at the same 250 micron spacing.

Currently available expanded beam multiple fiber connectors typically limit the beam diameter to 250 microns to match the ribbon pitch. In order to achieve a beam diameter greater than the fiber pitch, current connectors require the fiber ribbon to be manually split into single fibers before mounting the fibers on the connector.

In general, single fiber optical connectors can include a precision cylindrical ferrule for aligning and contacting optical fiber end faces with each other. The optical fiber can be secured in the central bore of the ferrule so that the fiber's optical core can be centered on the ferrule axis. The fiber tip can then be polished to allow physical contact of the fiber core. Two such ferrules can then be aligned with each other using an alignment sleeve with the polished fiber tips pressed against each other to achieve a physical contact optical connection from one fiber to another. Physical contact optical connectors are widely used.

Multiple fiber connectors often use a multiple fiber ferrule such as the MT ferrule to provide optical coupling from the source fibers to the receive fibers. The MT ferrule can guide the fibers in an array of molded bores to which the fibers are typically bonded. Each ferrule can have two additional bores in which guide pins are located to align the ferrules to each other and thus align the mated fibers.

A variety of other methods have also been used to make fiber to fiber connections. Included are V-groove alignment systems and bare fiber alignment in an array of precise bores. Some such connecting concepts make use of lenses and or reflecting surfaces in optical fiber connections. Each of these connecting concepts describes single purpose connection systems, such as an in line connector or a right angle connector.

Optical fiber interconnects such as multiple fiber connectors are useful for connecting optical waveguides to waveguides disposed on printed circuit boards (PCBs) and in backplane optical interconnect products. Expanded beam connectors have been disclosed that can terminate fiber ribbons without separating individual fibers and also can provide a beam with a diameter greater than the fiber-to-fiber pitch. These expanded beam optical connectors have non-contact optical mating and can require less mechanical precision than conventional optical connectors. Expanded beam connectors have been disclosed, for example, in Applicants' copending provisional patent applications, U.S. Ser. Nos. 61/710,077 and 61/710,083 (both Haase et al.), both entitled "Optical Connectors", and both filed on Oct. 5, 2012.

Optical interconnect coupling constructions (optical couplers or optical connectors) are provided that can be used to connect one or more optical waveguides, or a ribbon of optical waveguides, to another set of optical waveguides or one or more ribbons of optical waveguides. In some embodiments, the waveguides can be optical fibers. The provided connectors can also be used to connect one or more optical waveguides, or ribbons of optical waveguides, to waveguides disposed on or embedded in printed circuit boards or backplanes. The provided connectors include expanded beam optics with non-contact optical mating to provide relaxed mechanical precision requirements for their construction, thus enabling low-cost injection molding and improved resistance to dirt. The provided connectors utilize angularly staggered deflection of light to couple light from a row of input waveguides to two or more rows of output optical lenses, thereby permitting expanded beam sizes having diameters greater than the optical waveguide-to-optical waveguide pitch (input waveguide pitch) in input optical waveguide arrays such as, for example, in optical fiber ribbons. The provided connectors can have low optical loss, can be easily scalable to high channel count (optical fibers per connector), can provide safety to the user, and can be compatible with low insertion force blind mating. The provided connectors have suitability for use for backplane, front-plane, or mid-span connections.

In the following description, reference is made to the accompanying drawings that form a part hereof and in which are shown by way of illustration. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on", "connected to," "coupled with", or "in contact with", or "adjacent to" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as begin "directly on," "directly connected to," "directly coupled with," or "directly in contact with" another element, there are no intervening elements, components or layers for example.

Figure 1B:
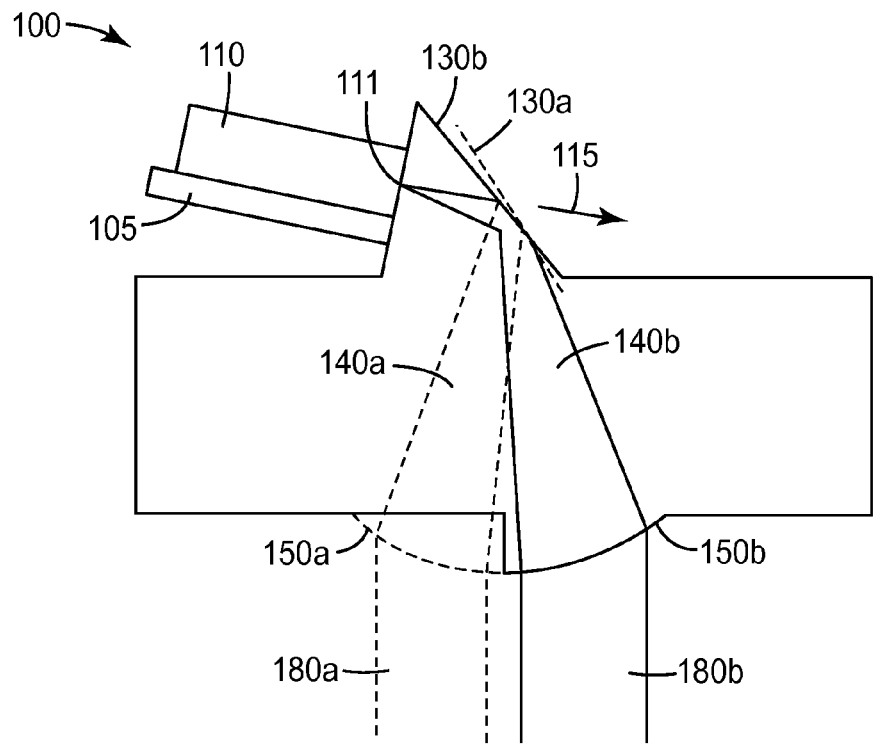
FIG. 1b is a side view illustration of an embodiment of a provided connector.

The provided connectors can be understood, but should not be limited by, the embodiments shown in FIGS. 1a and 1b. FIG. 1a is a schematic illustration of an embodiment of a provided connector. FIG. 1b is a side view illustration of an embodiment of a provided connector. Connector 100 includes waveguide alignment member 105 for receiving and aligning plurality of optical waveguides 110. Central incident light rays 116 of light exiting plurality of optical waveguides 110 propagate along a same incident direction 115 in a same incident plane (x-y plane, see directional vectors in FIG. 1a). Connector 100 includes light redirecting member 160. Light redirecting member 160 includes input side 165 for receiving incident light 116 from an optical waveguide of plurality of optical waveguides 110 disposed and aligned at waveguide alignment member 105 along incident direction 115 and transmitting received incident light along input direction 120. Light redirecting member 160 also includes light redirecting side 125 for receiving light from input side 165 along input direction 120 and redirecting received light along redirected directions 140a and 140b. Additionally, light redirecting member 160 includes output side 170 for receiving redirected input light and transmitting received redirected light 140a and 140b as output light through output side 170. Provided connector 100 also includes plurality of optical lenses 150.

Light redirecting side 125 of light redirecting member 160 includes plurality of segments 130. Plurality of segments 130 form a row (along y-axis in FIG. 1a), the row being parallel to incident plane (x-y plane). Each segment of plurality of segments 130 corresponds to a different optical waveguide of plurality of optical waveguides 110 disposed and aligned at waveguide alignment member 105. Each segment of plurality of segments 130 is configured to receive incident light 116 exiting the optical waveguide along incident direction 115. First segment 130a redirects light along first redirected direction 140a, second segment 130b redirects light along second redirected direction 140b. Second redirected direction 104b is different from first redirected direction 140a.

Connector 100 includes plurality of optical lenses 150 that form two or more rows of optical lenses. Each optical lens in plurality of optical lenses 150 corresponds to a different segment in plurality of segments 130 and is configured to receive light from the segment along a corresponding redirected direction and transmit the received light as output light 180 along a corresponding output direction 185a or 185b. The divergence of output light 180 is different than a divergence of light received by the optical lens. For example, as illustrated in FIG. 1a, first optical lens 150a corresponds to segment 130a and is configured to receive light from segment 130a along redirected direction 140a and transmit the received light as first output light 180a. Second optical lens 150b corresponds to segment 130b and is configured to receive light from segment 130b along second redirected direction 140b and transmit the received light as second output light 180b.

Figure 2:
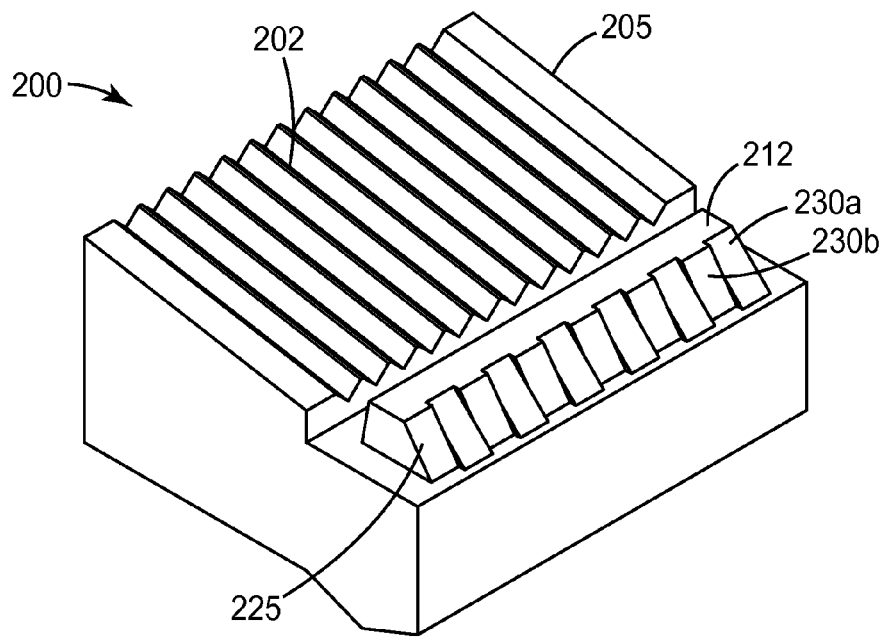
FIG. 2 is a perspective view of an embodiment of a portion of a provided connector.

FIG. 2 is a perspective view of a portion of an embodiment of a provided connector. As shown, connector 200 includes waveguide alignment member 205 which includes plurality of grooves 202 for receiving and aligning a plurality of optical waveguides (waveguides not shown). In the illustrated embodiment, the waveguides can be optical fibers. The optical fibers can be permanently attached to the grooves and so aligned that the light exiting each of the plurality of optical fibers propagates along the same incident direction in the same incident plane (defined by the plane in which the optical fibers are configured in the grooves). Light redirecting side 225 of light redirecting member 212 is configured to receive light exiting the optical waveguides along the incident direction. Light redirecting side 225 includes a plurality of segments (230a and 230b, for example) that form a row that is parallel to the incident plane. Each segment (230a and 230b, for example) corresponds to a different optical waveguide disposed and aligned at waveguide alignment member 205 and is configured to receive light exiting the optical waveguide along the incident direction and to redirect the received light along a redirected direction different from the incident direction. FIG. 2 shows alternating segments include light redirecting sides that are coplanar. In FIG. 2 there are two planes defined by the light redirecting sides of alternating segments (one plane that includes first segment 230a and another plane that includes segment 230b) that direct the light along two different redirected directions.

Figure 3A:
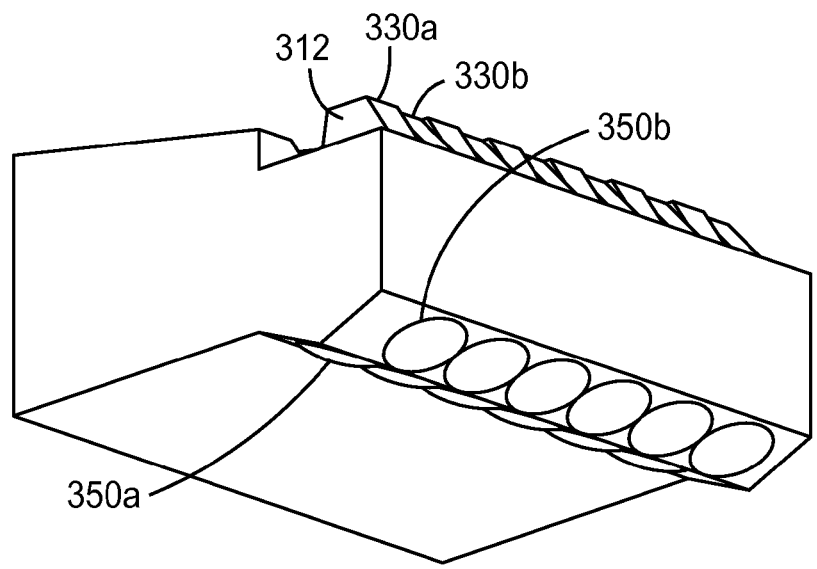
FIGS. 3a and 3b are different perspective views of the portion of the provided connector illustrated in FIG. 2.
Figure 3B:
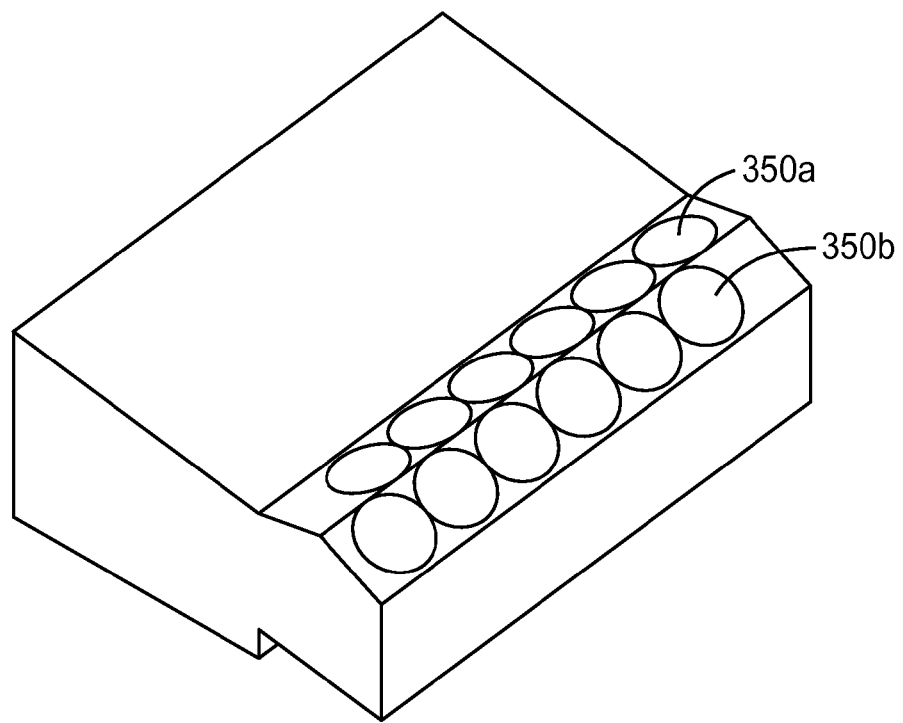

FIGS. 3a and 3b are different perspective views of the portion of a provided connector illustrated in FIG. 2. FIGS. 3a and 3b show light redirecting member 312 having first segment 330a and second segment 330b. First segment 330a redirects light from the first optical fiber in the plurality of optical fibers to lens 350a. Second segment 330b redirects light from the second optical fiber in the plurality of optical fibers to lens 350b. Additional alternating segments along the row of segments redirect light to a plurality of alternating lenses along a row of optical lenses to form two rows as shown in the exemplary figure.

In some embodiments, the plurality of alternating lenses along a row of optical lenses can be a unitary construction. In such an embodiment, the row of lenses starting with lens 350a and the row of lenses starting with lens 350b in FIGS. 3a-b as well as the body from which they project can all be made from one piece which, in some embodiments, can be molded. This unitary piece can constitute a structured surface that comprises a plurality of optical lenses. The plurality of optical lenses can cover at least 70%, at least 75%, at least 80%, at least 85%, at least 90%, or at least 95% of the structured surface. A central light ray of a first collimated light incident on a first optical lens in the plurality of optical lenses along an incident direction is deflected by the first optical lens along a first direction and a central light ray of a second collimated light incident on a different second optical lens in the plurality of optical lenses along the incident direction is deflected by the second optical lens along a second direction different from the first direction. In some embodiments of the structured surface, the first and second central light rays can be transmitted by the respective first and second optical lenses. In some embodiments of the structured surface, the first and second central light rays can be reflected by the respective first and second optical lenses. In some embodiments of the structured surface, each optical lens can have a focal spot on the same side of the structured surface. In some embodiment, a structured surface having a unitary construction can comprise a plurality of optical lenses covering at least 70% of the structured surface.

FIGS. 1a-b, 2, and 3a-b are for illustrative purposes only. It is contemplated that a provided connector can have more than two rows of optical lenses and more than two coplanar groups of redirecting members. It is also contemplated that the redirecting segments do not have to alternate and can be placed in any desired order. However, in the illustrated embodiment, alternating lenses take up less geometric space on the connector and are shown for efficiency of size.

In some embodiments, light in a provided connector can exit an optical waveguide disposed and aligned at the waveguide alignment member as diverging light. In these embodiments, the central light ray of the exiting light can be substantially at a center of the diverging light. In some embodiments, a half divergence angle of light exiting an optical waveguide that can be disposed and aligned at the waveguide alignment member as divergent light can be selected from less than about 15 degrees, less than about 14 degrees, less than about 13 degrees, less than about 12 degrees, and less than about 11 degrees. In some embodiments, a half divergence angle of light that can be received by a segment in the plurality of segments from a corresponding waveguide disposed and aligned at the waveguide alignment member can be selected from less than about 11 degrees, less than about 10 degrees, less than about 9 degrees, less than about 8 degrees, and less than about 7 degrees.

In some embodiments, each optical waveguide in the plurality of optical waveguides disposed and aligned at the waveguide alignment member can include an exit end from which light exits the optical waveguide. The waveguide alignment member can be configured such that when the plurality of optical waveguides are dispersed and aligned at the waveguide alignment member, the exit ends of the optical waveguides form a row parallel to the row of segments in the plurality of segments. The exit end of each optical waveguide can be substantially perpendicular to an optical axis of the optical waveguides. The exit end of at least one optical waveguide can make an oblique angle with an optical axis of at least one optical waveguide.

In some embodiments of a provided connector, each optical waveguide in the plurality of optical waveguides that is disposed and aligned at the waveguide alignment member can include an exit end from which light exits the optical waveguide. In these embodiments, the waveguide alignment member can be configured such that when the plurality of optical waveguides are disposed and aligned at the waveguide alignment member, the exit ends of the optical waveguides can form a staggered arrangement in a same plane.

In some embodiments of a provided connector, the plurality of segments can include alternating first and second segments. Each first segment can redirect light along a first redirected direction and each second segment can redirect light along a second redirected direction. In some embodiments, the light redirecting side of a provided connector can be a unitary structure. In some other embodiments of the provided connector, the first segment can make an oblique angle with the second segment.

In some embodiments of a provided connector, a first lens in a first row of lenses in the plurality of optical lenses can receive light from the first segment along a first redirected direction and a second lens in a second row of lenses in the plurality of optical lenses can receive light from the second segment along a second redirected direction. In some embodiments of a provided connector, when each optical lens in the plurality of lenses receives light from the corresponding segment, the received light can be transmitted as output light along a same output direction. In some embodiments, for at least some of the lenses in the plurality of optical lenses, the output direction can be different from the redirected direction. In some embodiments of a provided connector, the waveguide alignment member can include a plurality of waveguide alignment elements. Each waveguide alignment element can be configured to receive and align a different optical waveguide. In some embodiments, each waveguide alignment element can include a groove. Some embodiments of a provided connector include at least one alignment feature for receiving and aligning a plurality of optical waveguides integrated onto a common body such as a common substrate. In some embodiments, the waveguide alignment member can include at least one alignment feature for receiving and aligning a ribbon comprising a plurality of optical waveguides. In some embodiments, at least some of the segments in the plurality of segments can be planar and in some embodiments, at least some of the segments in the plurality of segments can be curved.

In some embodiments, a provided connector can have output light from at least some optical lenses in the plurality of lenses be collimated light. In some other embodiments, the output light from at least some optical lenses in the plurality of optical lenses can be converging light.

In some embodiments, a provided connector can have the plurality of optical lenses include a plurality of first optical lenses disposed along a first row in a first plane and a plurality of second optical lenses disposed along a second row in a different second plane. In some embodiments, the first plane can make an oblique angle with the second plane. In some embodiments, the plurality of optical lenses can include a plurality of first optical lenses disposed along a first row in a first plane and a plurality of second optical lenses disposed along a second row in the first plane. In some embodiments, a provided connector can have each optical lens in the plurality of optical lenses include a major curved section for changing the divergence of light received by the optical lens from a corresponding segment in the plurality of segments. The major curved section of at least one optical lens can not have an axis of rotational symmetry.

In some embodiments, a provided connector can further include a light redirecting member that can include an input side for receiving an incident light from an optical waveguide disposed and aligned at the waveguide alignment member along the incident direction and transmitting the received light as input light along an input direction. The light redirecting member can also include a light redirecting side for receiving light from the input side along the input direction and redirecting the received light along the redirected direction. Additionally, the light redirecting member can include an output side with a plurality of optical lenses for receiving light from the light redirecting side and transmitting the received light as the output light. The provided connector can be a unitary structure. In some embodiments, the index of refraction for at least portions of the optical path of light from an optical waveguide disposed and aligned at the waveguide alignment member propagating along an optical path from the input side to the output side of the light redirecting member can be greater than one. In some embodiments, the index of refraction of at least some other portions of the optical path of light from an optical waveguide disposed and aligned at the waveguide alignment member propagating along an optical path from the input side to the output side of the light redirecting member can be the refractive index of air. In some embodiments, the light redirecting member can be solid and can have a greater than one index of refraction between the input side and the output side. In some embodiments, light from an optical waveguide disposed and aligned at the waveguide alignment member can propagate along an optical path from the input side to the output side of the light redirecting member where the entire optical path has an index of refraction of greater than one. In some embodiments, at least some of the optical lenses in the plurality of optical lenses can be disposed on one of the light redirecting and output sides of the light redirecting member. In some embodiments, the optical lenses in the plurality of optical lenses are disposed on the output side of the light redirecting member.

In some embodiments, a connector is provided where each optical lens in the plurality of optical lenses can include a light receiving major surface and an opposing light outputting major surface. In these embodiments, at least one of the light receiving and light outputting major surfaces can be curved. In some embodiments, the optical lenses in the plurality of optical lenses can be arranged in a square, rectangular, or hexagonal closely packed array. In some embodiments, the diameter of each optical lens in the plurality of optical lenses of a provided connector can be selected from 150 microns, 180 microns, 200 microns, 250 microns, 300 microns, 350 microns, 400 microns, 450 microns, and 500 microns.

In some embodiments, a provided connector can further include a plurality of light redirecting elements where each light redirecting element can correspond to a different segment in the plurality of segments and to a different optical lens in the plurality of optical lenses. Each of the light redirecting elements can include a light input side for receiving incident light from an optical waveguide disposed and aligned at the waveguide alignment member along an incident direction and transmitting the received light as input light along an input direction. Each of the light redirecting elements can also include a segment corresponding to the light redirecting element for receiving light from the input side along the input direction and redirecting light along the redirected direction. Each of the light redirecting elements can include an output side for receiving light from the corresponding segment and transmitting the received light as the output light. The provided connector can also have an optical lens corresponding to each segment and each light redirecting element.

A cable assembly is provided that includes provided connectors as described herein and a plurality of optical waveguides received and aligned at the waveguide alignment member. The optical waveguides can be permanently attached to the connector. In some embodiments, each optical waveguide in the plurality of optical waveguides can be an optical fiber. The provided cable assembly can have an index matching material optically coupling at least one optical waveguide in the plurality of optical waveguides to the input side of the light redirecting member. In some embodiments, each optical waveguide in the plurality of optical waveguides can have a core diameter in a range selected from 1 micron to 15 microns, from 40 microns to 1000 microns, from 2 microns to 200 microns, from 50 microns to 500 microns, from 100 microns to 400 microns, from 150 microns to 350 microns, or from 200 microns to 300 microns. In some cases, each optical waveguide in the plurality of optical waveguides has a core diameter in a range from 50 microns to 62.5 microns. In some embodiments, at least one optical waveguide in the plurality of optical waveguides can be a single mode optical waveguide for light wavelengths in a range selected from 0.35 microns to 2.00 microns, from 1.30 microns to 1.65 microns, and from 1.31 microns to 1.55 microns. In some embodiments, at least one optical waveguide in the plurality of optical waveguides can be a multimode optical waveguide for light wavelengths in a range selected from 0.35 microns to 2.00 microns, from 0.75 microns to 1.00 microns, and from 0.83 microns to 0.88 microns.

A connector assembly is provided that includes a first connector and a second connector as described herein. The first connector can be the same as the second connector or can be different than the second connector. In some embodiments, each optical waveguide in one connector can correspond to a different optical waveguide in the other connector and each optical lens in one connector can correspond to a different optical lens in the other connector. The light exiting an optical waveguide in one connector can enter the corresponding optical waveguide in the other connector after being redirected by the corresponding segment in the connector toward the corresponding optical lens in the connector, after being transmitted by the corresponding optical lens in the connector toward the corresponding optical lens in the other connector, being transmitted by the optical lens in the other connector toward the corresponding segment in the other connector, and being redirected by the corresponding segment in the other connector toward the corresponding optical waveguide in the other connector. In some embodiments, the connector assembly can have collimated light propagating between an optical lens of one connector and the corresponding optical lens of the other connector. In some embodiments, light propagating between an optical lens of one connector and the corresponding optical lens of the other connector can propagate through a focal spot.

Figure 4:
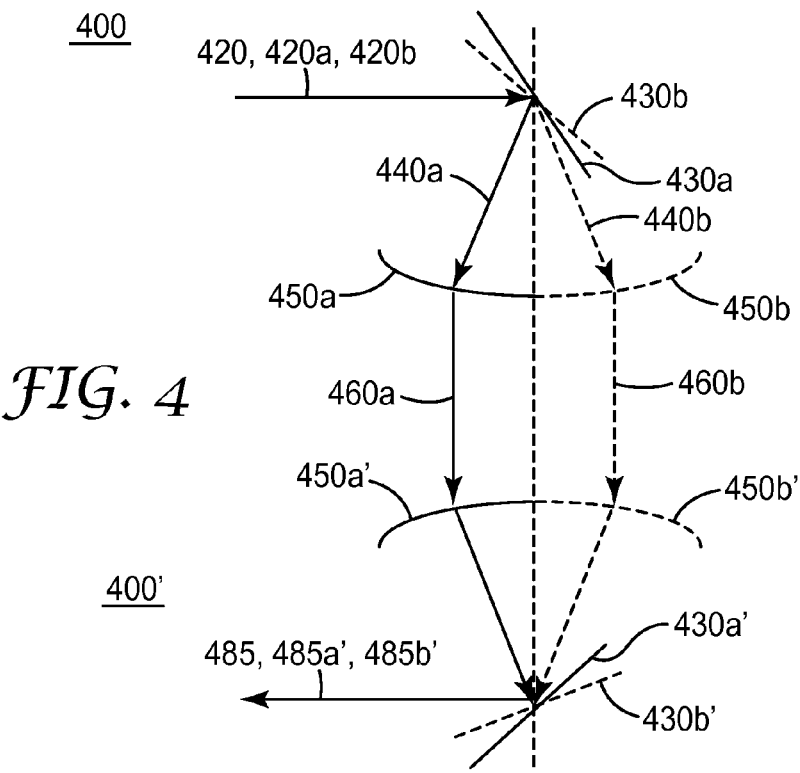
FIG. 4 is a ray trace schematic of an embodiment of a provided connector assembly.
Figure 5:
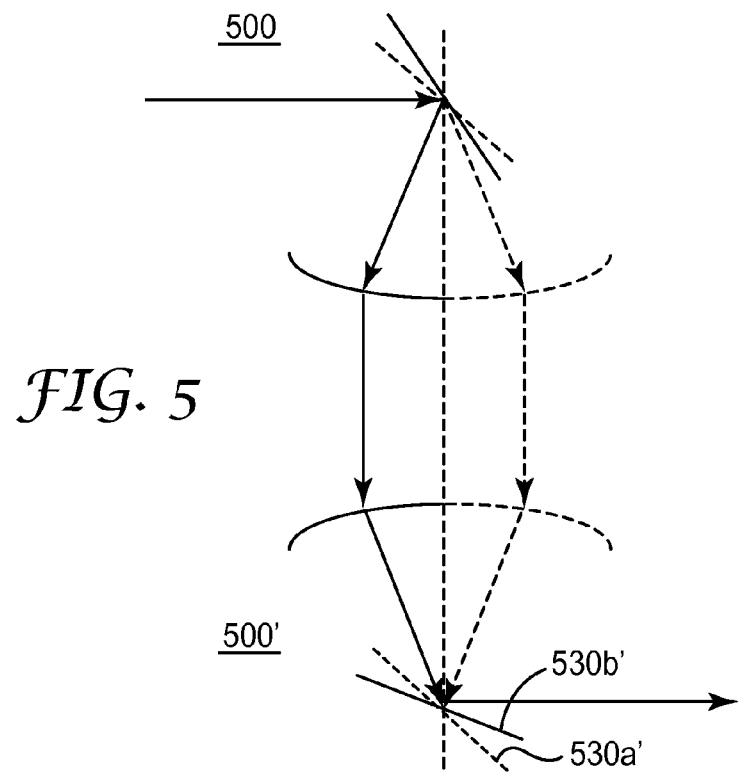
FIG. 5 is ray trace schematic of another embodiment of a provided connector assembly.

In some cases, first and second provided connectors are mated such that light that is incident on the first connector along a first direction passes through the two connectors and after exiting the second connector propagates along a second direction opposite the first direction and couples to an optical waveguide. Such a mating is referred to as a 180 degree deviation of light. In some cases, first and second provided connectors are mated such that light that is incident on the first connector along a first direction passes through the two connectors and after exiting the second connector propagates along the first direction and couples to an optical waveguide. Such a mating is referred to as a 0 degree deviation of light. FIGS. 4 and 5 are ray trace schematics of two embodiments of a provided connector assembly the comprises a first connector and a second connector mated together. FIG. 4 shows the optical path light travelling through first connector 400 mated to second connector 400', configured for a 180 degree deviation. Input ray 420 from a first optical waveguide is redirected by segment 430a of the corresponding light redirecting element of first connector 400. Redirected ray 440a passes through at least a portion of output connector lens 450a and is transmitted by corresponding lens 450a toward a corresponding optical connector lens 450a' in second connector 400'. After exiting optical connector lens 450a, ray 460a is part of a substantially collimated beam. Light ray 460a is then inputted to at least a portion of optical connector lens 450a' of second connector 400' where it is transmitted towards segment 430a' of the corresponding light redirecting element of second connector 400', where it is redirected as ray 485a which is received by a corresponding waveguide attached to the second connector.

In an analogous manner, input ray 420b from a second optical waveguide is redirected by segment 430b of the corresponding light redirecting element of first connector 400. Redirected ray 440b passes through at least a portion of output connector lens 450b and is transmitted by corresponding lens 450b toward a corresponding optical connector lens 450b' in second connector 400'. After exiting optical connector lens 450b, ray 460b is part of a substantially collimated beam. Light ray 460b is then inputted to at least a portion of optical connector lens 450b' of second connector 400' where it is transmitted towards segment 430b' of the corresponding light redirecting element of second connector 400'. With the orientation of segments 430a-b and 430a'-b' as shown, light exits second connector 400' propagating in a direction substantially opposite to the direction of input rays 420. In this configuration, a ray redirected in the first connector at a segment having a first angle is redirected in the second connector by a segment having the first angle.

FIG. 5 shows another embodiment of a provided connector assembly configured for 0 degree deviation. First connector 500 is identical to first connector 400 shown in FIG. 4. Second connector 500' has segments 530a' and 530b' oriented so that light exits second connector 500' propagating in a direction substantially the same as that of input rays 520. In this configuration, a ray redirected in the first connector at a segment having a first angle is redirected in the second connector by a segment having a different second angle.

Figure 6:
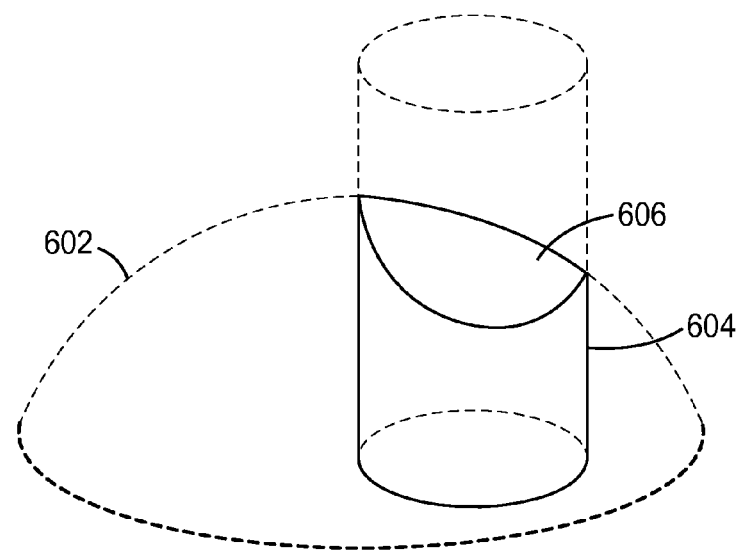
FIG. 6 is a schematic of an embodiment of a single lens element useful in provided connectors.
Figure 7:
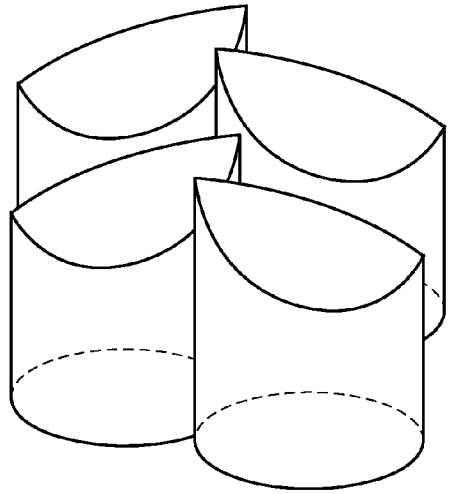
FIG. 7 is a schematic of an embodiment of an array of single lens elements useful in a provided connector.
Figure 8:
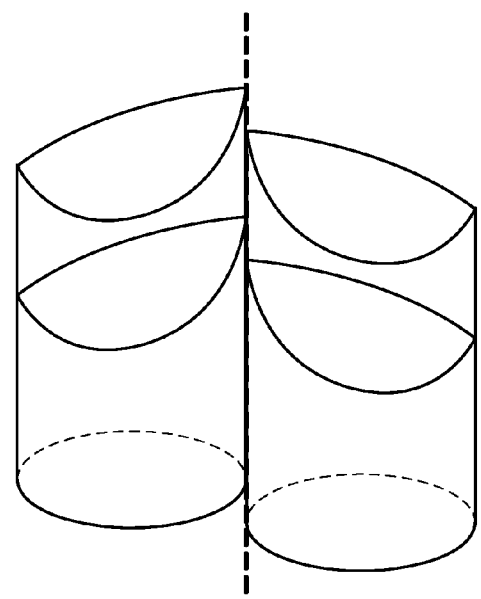
FIG. 8 is schematic of another embodiment of an array of single lens elements useful in a provided connector.

FIG. 6 is a schematic of a single lens element useful in provided connectors and in the embodiments of connector assemblies described above. Single lens element 606 is shown as a section of spherical lens 602. Off-center cylindrical section 604 serves as a collimator lens for light directed to lens element 606 passing through the focal point of lens surface 602. FIG. 7 shows an array of lens elements arranged in a staggered close packed array as might be present in an embodiment of a provided connector. FIG. 8 shows another array of lens elements useful in the provided connectors, where the lenses are arrayed in two non-overlapping rows.

Figure 9:
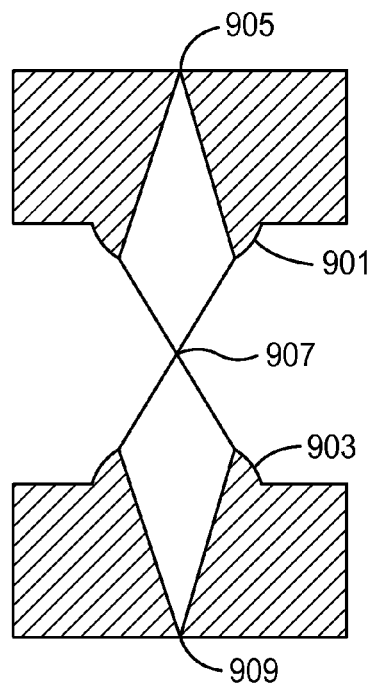
FIG. 9 is a side view of a schematic of conjugate focus coupling using substantially full lens aperture.

In some embodiments of provided connector assemblies, the light beam exiting from the first connector may not be collimated but may be focused. FIG. 9 is a side view of a schematic of a conventional conjugate focus coupling arrangement of the prior art, in which the full lens aperture is illuminated. Light beam 905 diverges after it exits from a provided waveguide of the first connector (top connector). The divergent light beam then is focused by the full aperture of lens element 901 through conjugate focal point 907 and into lens 903 of a second mating connector (bottom connector) where it converges at point 909 and is coupled into the second mating connector.

Figure 10:
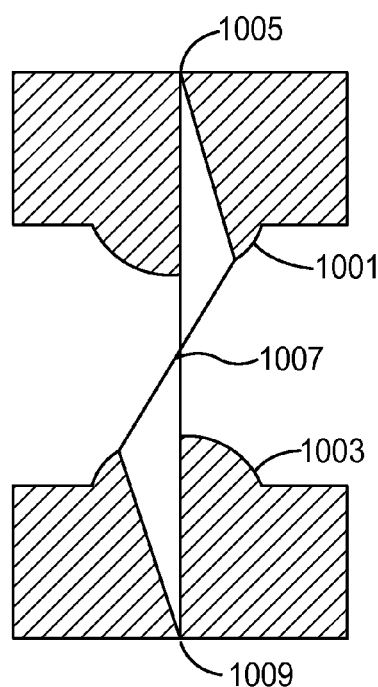
FIG. 10 is a side view of a schematic of conjugate focus coupling where only a part of the lens aperture is illuminated.

FIG. 10 is a side view of a schematic of conjugate focus coupling configuration like that of FIG. 9, except that here the light diverging from the input waveguide only partially fills the aperture of the lens. Light beam 1005 is directed as shown to partially fill lens 1001 of a first connector (top connector). The beam then travels through focal point 1007 and into lens 1003 of the second mating connector as shown.

Figure 11:
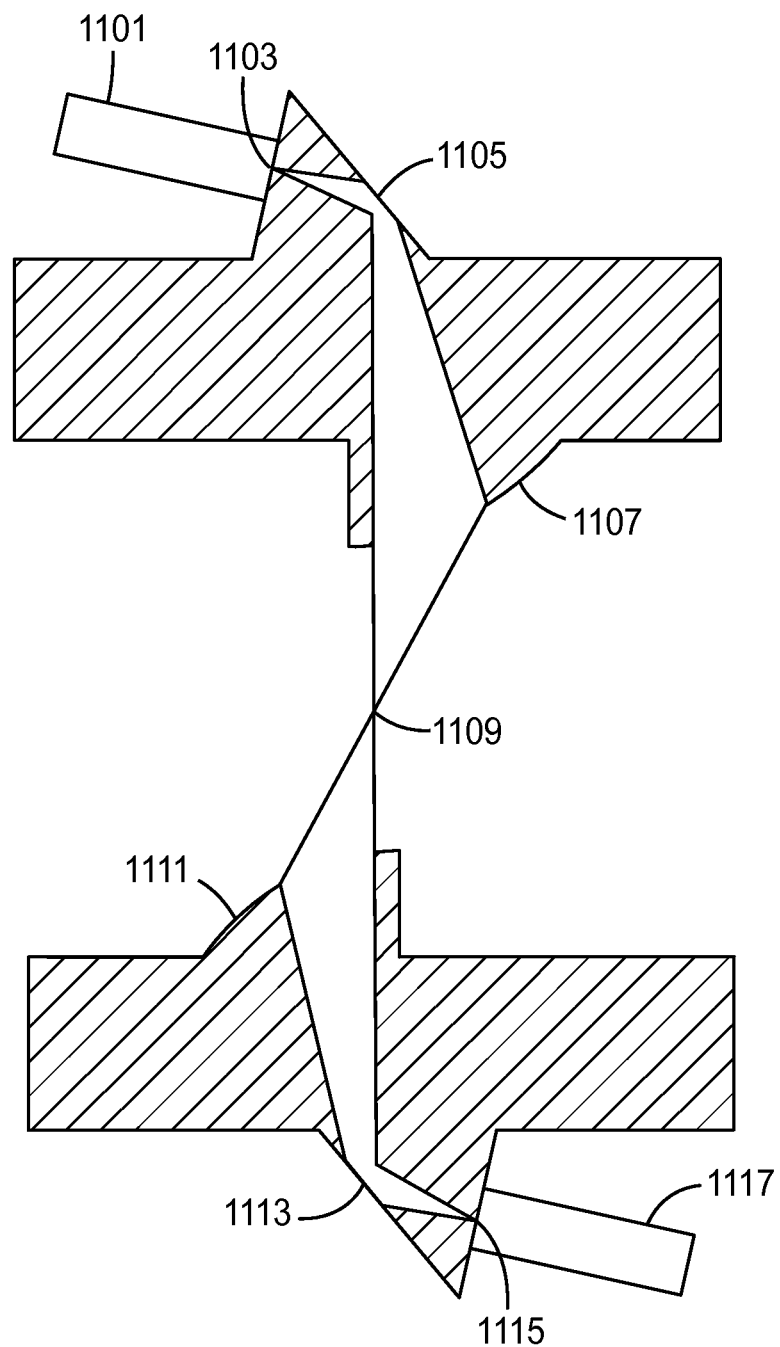
FIG. 11 is a side view of a schematic of conjugate focus coupling in two mated connectors of a provided connector assembly where only a part of the lens aperture is illuminated and where the part of the lens not illuminated has been removed.

Conjugate focus coupling through partial lens apertures as illustrated in FIG. 10 can be used in embodiments of a provided coupler as shown in FIG. 11. Optical waveguide 1101 couples light into the first coupler (top) at point 1103. The light diverges as it travels through the coupler and is redirected by segment 1105. The beam continues to diverge until it is focused by lens 1107 as shown. The beam then converges until it passes through focal point 1109 and then it diverges as it partially fills lens 1111 of the second coupler (bottom). The now converging beam is redirected by segment 1113 of the second coupler after which it exits the second coupler at point 1115 where it is coupled into waveguide 1117.

Figure 12A:
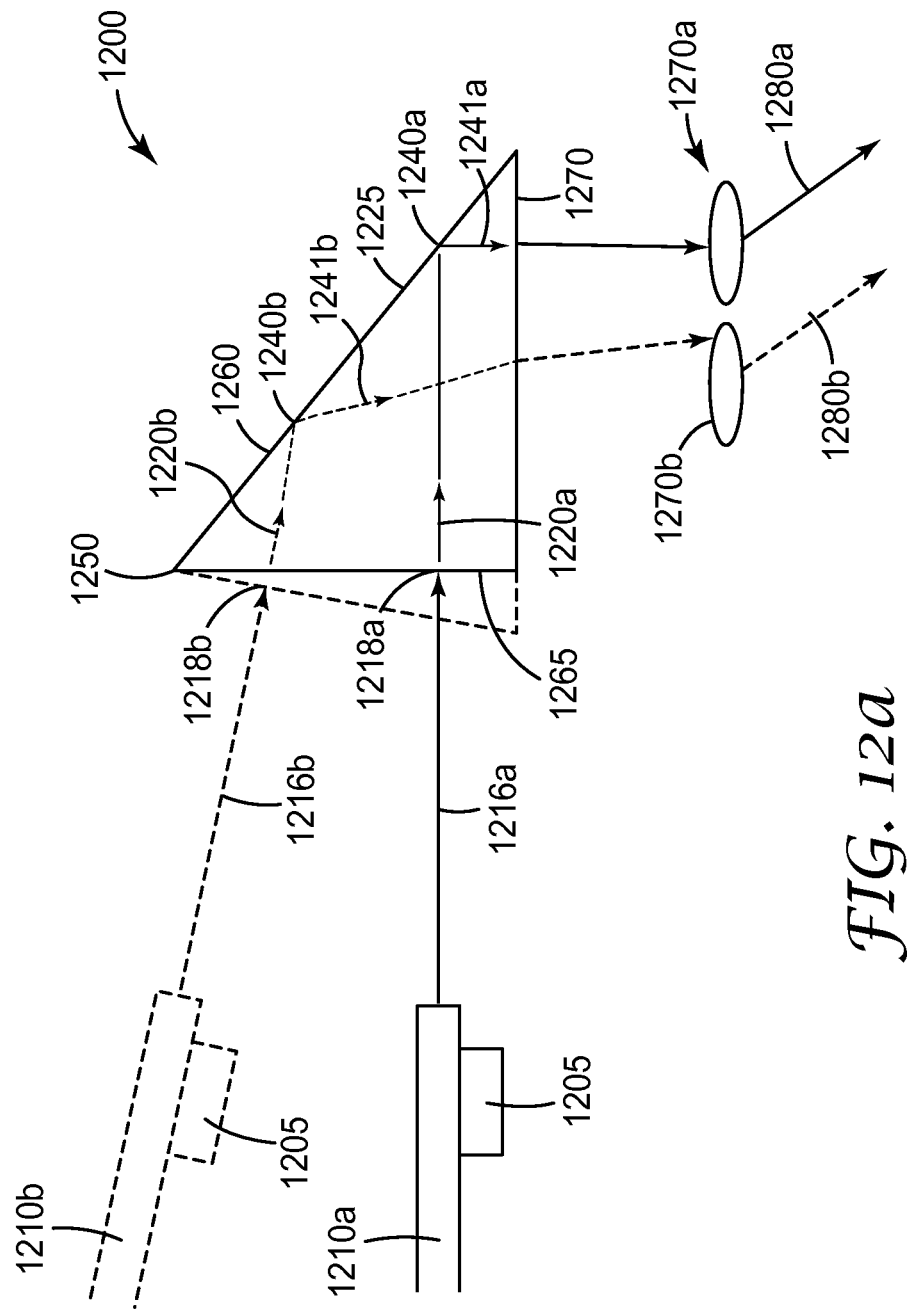
FIG. 12a is a side view schematic diagram of an embodiment of a connector assembly having angularly-staggered input optical waveguides.
Figure 12B:
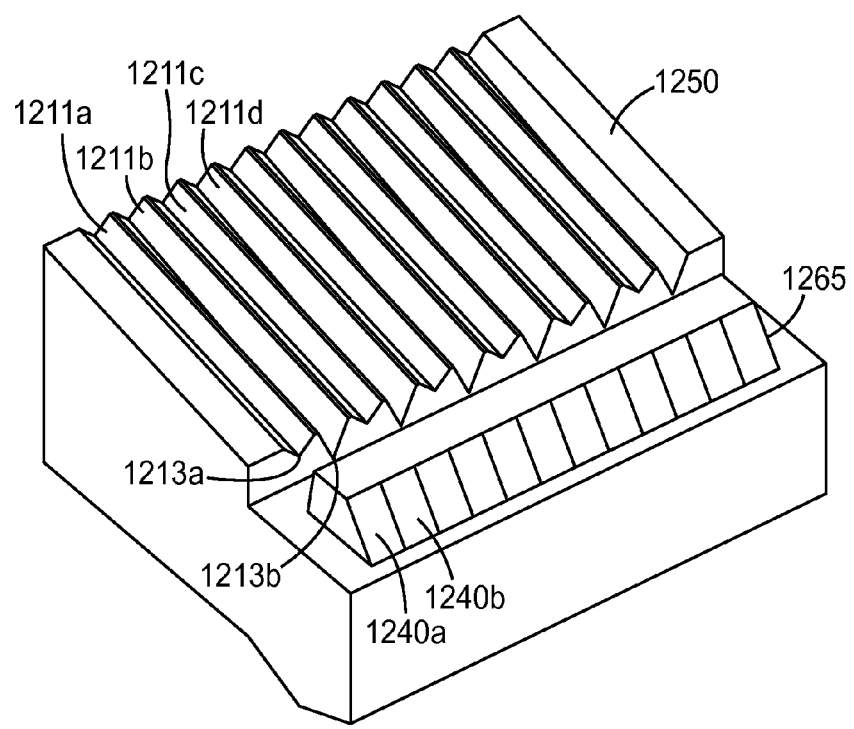
FIG. 12b is a perspective view of an embodiment of a connector having angularly-staggered optical waveguide alignment members.

FIGS. 12a and 12b are a side view schematic and a perspective view of embodiments of a provided connector 1200 where the input optical waveguides are angularly staggered. In these embodiments, all of the segments of light redirecting side 1260 of light redirecting member 1250 are parallel and, in some embodiments, can be of a unitary structure. FIG. 12a is a schematic that shows two optical waveguides 1210a and 1210b disposed and aligned by waveguide alignment member 1205. Optical waveguide 1210b is shown in dotted lines since it is behind the plane of the side view of optical waveguide 1210a as shown. The central light rays of light exiting optical waveguides 1210a and 1210b propagate along at least two different incident directions 1216a and 1216b. Optical waveguides 1210a and 1210b show light beams 1216a and 1216b exiting the respective waveguides and entering input side 1265 of light redirecting member 1250 at different incident angles. In some embodiments, optical waveguides 1216a and 1216b have exit faces that are cut perpendicular to the direction of the propagation in each waveguide. In these embodiments, light redirecting member 1250 can have segments that have staggered input facets arranged so that the exit face of each optical waveguide is always substantially parallel to the respective input facet of the light redirecting member. FIG. 12*a* shows light from optical waveguide 1210*a* propagating along incident direction 1216*a* and then entering the input side of light redirecting member 1250 at point 1218*a* where incident direction 1216*a* is substantially perpendicular to the input facet at point 1218*a*. Analogously, light from optical waveguide 1210*b* propagating along incident direction 1216*b* enters the input side of light redirecting member 1250 at point 1218*b* where the input facet of that segment of light redirecting member 1250 is staggered so that incident direction 1216*b* is substantially perpendicular to the input facet at point 1218*b*. In these embodiments, the input side of light redirecting member 1250 has segments that are angularly matched to the facets of the optical waveguide assuming that the facets of the optical waveguide are flat and perpendicular to the axis of the optical waveguide.

Light rays 1220*a* and 1220*b* are redirected by light redirecting side 1260 of light redirecting member 1250 at locations 1240*a* and 1240*b* respectively along two different redirected directions shown by redirected beams 1241*a* and 1241*b*. Redirected beams 1241*a* and 1241*b* pass through exit side 1270 of light redirecting member 1250 where they are redirected by optical lenses 1270*a* and 1270*b* to follow output light paths 1280*a* and 1280*b* respectively. A divergence of output light is different than a divergence of light received by each optical lens.

FIG. 12*b* is a perspective view of one embodiment of the provided connector shown in FIG. 12*a*. Angularly-staggered waveguides, in some cases optical fibers (not shown), are disposed and aligned by waveguide alignment member 1250. Waveguide alignment member 1250 has a plurality of grooves 1211*a* and 1211*b* that are not parallel to each other. For example, the first optical waveguide is disposed and aligned along groove 1211*a* that aligns the optical waveguide along a line from groove 1211*a* to point 1213*a* at the end of groove 1211*a*. The second optical waveguide is disposed and aligned along groove 1211*b* that aligns the optical waveguide along a line from groove 1211*b* to point 1213*b* at the end of groove 1211*b*. In this arrangement, the first optical waveguide and the second optical waveguide are not parallel but enter waveguide alignment member 1250 at different angles. Similarly, in the embodiment shown in FIG. 12*b* the angles of the grooves alternate so that third groove 1211*c* is parallel to first groove 1211*a* and fourth groove 1211*d* is parallel to second groove 1211*b*. In other embodiments, it is contemplated that there may be other arrangement of the grooves depending upon where the coupler is designed to direct light. The light emanating from the first optical waveguide, the second optical waveguide, or any additional optical waveguides is redirected by segments 1240*a* and 1240*b* as shown.

In another aspect, a connector is provided that includes a unitary light redirecting side configured to receive central light rays exiting a plurality of optical waveguides along a same incident direction in a same x-y plane. The unitary light redirecting side can include a plurality of segments forming a row of segments along the y-axis of the x-y plane. The row of segments can be parallel to the plane and each segment can correspond to a different optical waveguide and can be configured to receive light exiting the optical waveguide along the incident direction. Each row of segments can also redirect the received light along a redirected direction different from the incident direction. At least one first redirected direction can make an oblique angle with at least one second redirected direction.

In yet another aspect, a light redirecting member is provided that is unitary and includes a light input side through which light enters the light redirecting member, a light redirecting side for redirecting the entered light, and a light output side through which the redirected light exits the light redirecting member. The light redirecting side can include first and second segments arranged along a first direction. The output side can include first and second optical lenses offset relative to each other along at least a second direction perpendicular to the first direction. The unitary light redirecting member can be configured so that light redirected by the first and second segments can exit the light redirecting member after propagating through the first and second optical lenses, respectively. In some embodiments, the light redirecting member can have first and second optical lenses that are offset relative to each other along the first and second directions.

In another aspect, a light redirecting assembly is provided that can be unitary and can include the light redirecting member described above. The light redirecting assembly can be configured so that light exiting the first and second optical waveguides can enter the light redirecting member through the light input side. The light can be redirected by the respective first and second segments and can exit the light redirecting member after propagating through the respective first and second optical lenses.

Figure 13A:
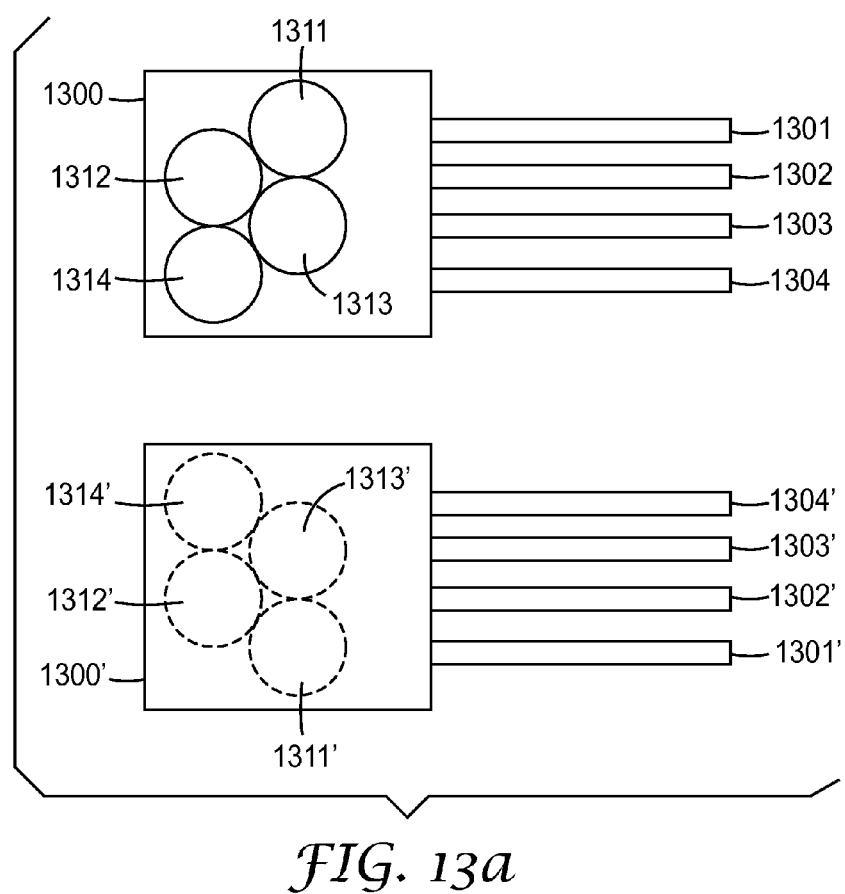
FIG. 13a is a schematic diagram of two mated provided connectors having the same staggered lens arrangement, one viewed from the lens side and one viewed from the opposite side and oriented for mating in a U-turn (180 degree turn) configuration.
Figure 13B:
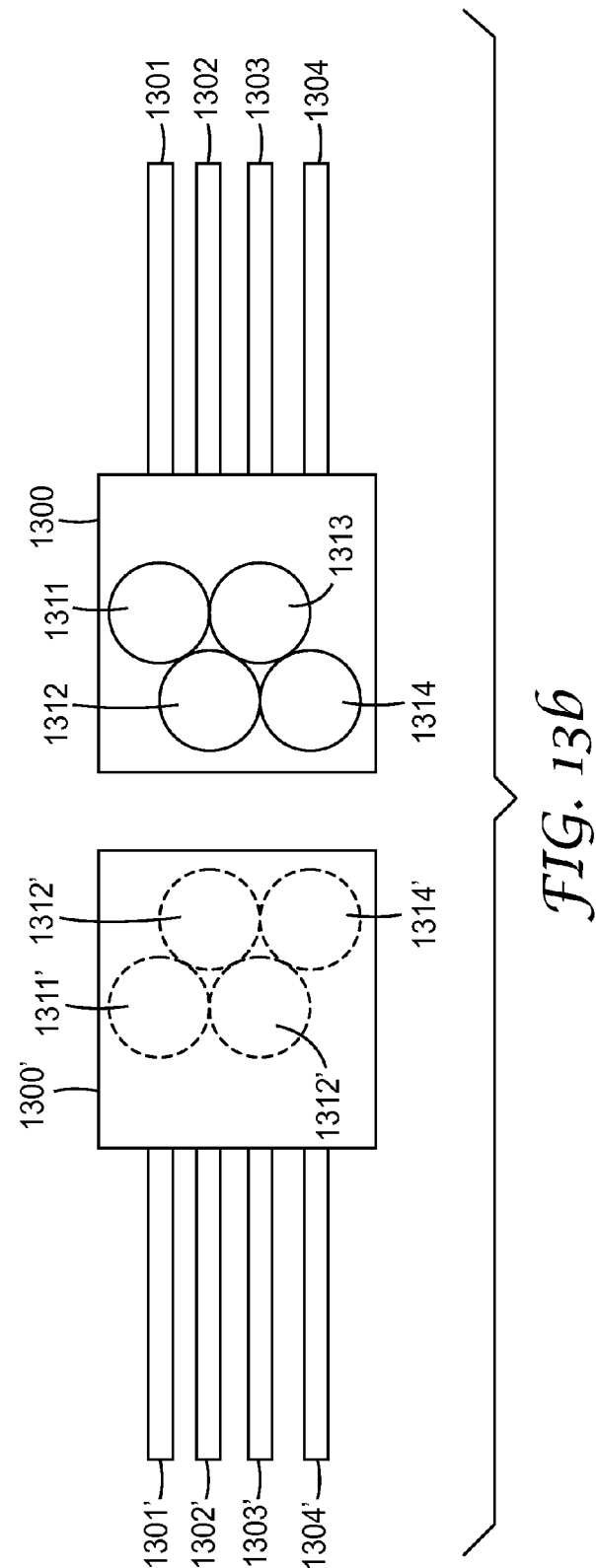
FIG. 13b is a schematic diagram of two mated provided connectors having the same staggered lens arrangement, one viewed from the lens side and one viewed from the opposite side and oriented for mating in a straight-through (0 degree turn) configuration.

Provided connectors can be mated to each other so that a plurality of optical waveguides entering a first mated connector in a first incident direction can exit a second mated connector, mated to the first mated connector in a U-turn (180 degree deviation) or in a straight-through (0 degree deviation) configuration. FIGS. 13*a* and 13*b* are schematic diagrams of pairs of identical provided connectors 1300 and 1300'. Connector 1300 is shown with the lens side up and connector 1300' is shown with the lens side down. Each connector has a staggered array of optical lenses. In FIG. 13*a* the two connectors are oriented to mate in a U-turn configuration and in FIG. 13*b* the two connectors are oriented to mate in a straight-through configuration. In each figure, the two connectors are shown separated from each other for ease of viewing the relative positions of the lenses. First connector 1300 has a plurality of optical waveguides that includes four optical fibers 1301, 1302, 1303, and 1304 that propagate along a same incident direction in a same incident plane. Light from first optical fiber 1301 is directed to optical lens 1311 by a light redirecting member (not shown). Similarly, light from second optical fiber 1302, third optical fiber 1303, and fourth optical fiber 1304 are directed to optical lens 1312, 1313, and 1314 respectively. The array of optical lenses 1311-1314 form a staggered close-packed array as shown in FIGS. 13*a* and 13*b*. Analogously, second connector 1300' has a plurality of optical waveguides that includes four optical fibers 1301', 1302', 1303', and 1304' that propagate along a same incident direction in a same incident plane. Light from first optical fiber 1301' is directed to optical lens 1311' by a light redirecting member (not shown). Similarly, light from second optical fiber 1302', third optical fiber 1303', and fourth optical fiber 1304' are directed to optical lens 1312', 1313', and 1314' respectively. The array of optical lenses 1311'-1314' form a staggered close-packed array as shown in FIGS. 13*a*-*b*. When connectors 1300 and 1300' are mated, connector 1300' is aligned above connector 1300 so that the lens arrays correspond and light entering connector 1300 via the attached fibers exits connector 1300' via attached fibers. However, in these configurations, due to the symmetry of the arrangement of the staggered array of optical lenses in each connector, all of the lenses cannot be aligned when the connectors are mated. Therefore, two differently configured connectors are required to align all of the lenses (for example, a male and a female connector). Alternatively, identical connectors can be mated by shifting or offsetting their location so that, in FIGS. 13a and 13b as shown, three of the optical lenses from each connector can be aligned. With identical connectors having n lenses in a staggered closest packed array, it will only be possible to connect (n−1) optical waveguides due to the non-hermaphrodicity of the lens array arrangements of each of the mated connectors.

Figure 14A:
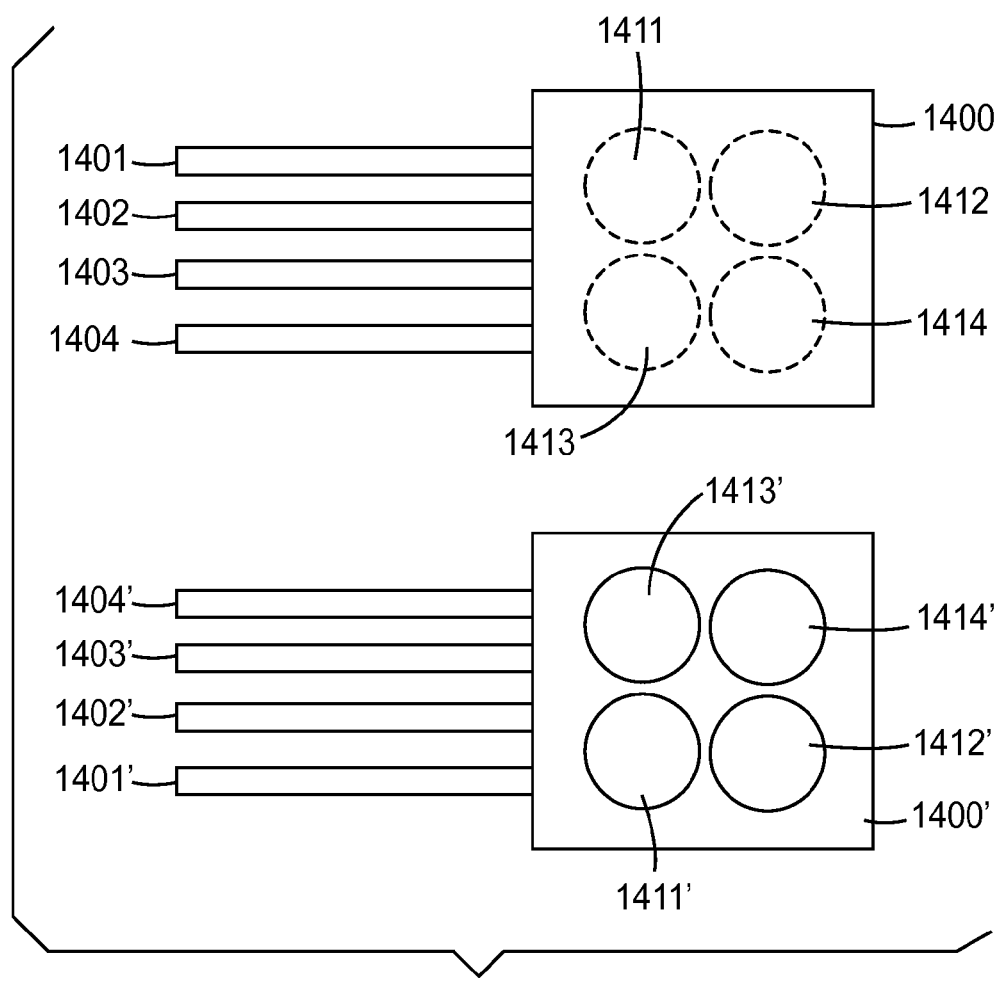
FIG. 14a is a schematic diagram of two mated provided connectors having the same rectangular array of lenses, one viewed from the lens side and one viewed from the opposite side and oriented for mating in a U-turn (180 degree turn) configuration.
Figure 14B:
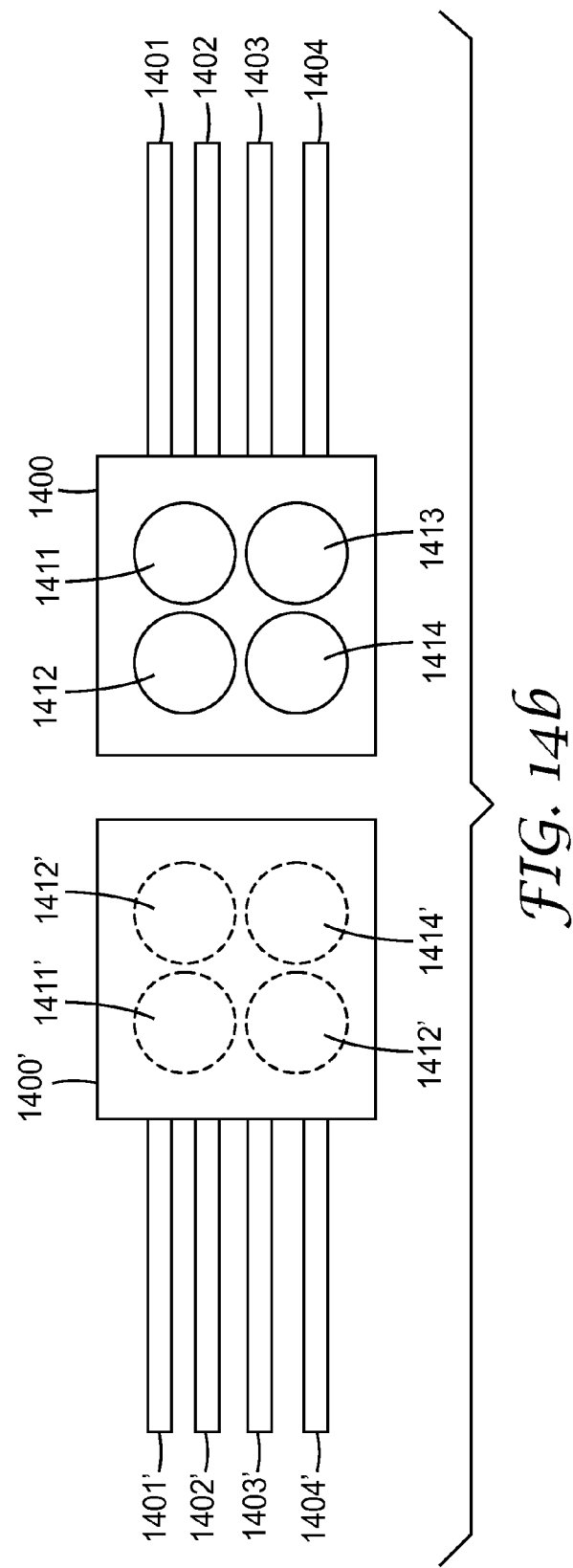
FIG. 14b is a schematic diagram of two mated provided connectors having the same rectangular array of lenses, one viewed from the lens side and one viewed from the opposite side and oriented for mating in a straight-through (0 degree turn) configuration.

FIGS. 14a and 14b are schematic diagrams of two mated provided connectors having a rectangular, rather than a staggered, array of optical lenses oriented to mate in a U-turn and a straight-through configuration, but not positioned above one another in a mating relationship. First connector 1400 (shown in a lens down orientation) has a plurality of optical waveguides that includes four optical fibers 1401, 1402, 1403, and 1404 that propagate along a same incident direction in a same incident plane. Light from first optical fiber 1401 is directed to optical lens 1411 by a light redirecting member (not shown). Similarly, light from second optical fiber 1402, third optical fiber 1403, and fourth optical fiber 1404 are directed to optical lens 1412, 1413, and 1414 respectively. The array of optical lenses 1411-1414 form a rectangular array as shown in FIGS. 14a and 14b. Analogously, second connector 1400' (shown in a lens up orientation) has a plurality of optical waveguides that includes four optical fibers 1401', 1402', 1403', and 1404' that propagate along a same incident direction in a same incident plane. Light from first optical fiber 1401' is directed to optical lens 1411' by a light redirecting member (not shown). Similarly, light from second optical fiber 1402', third optical fiber 1403', and fourth optical fiber 1404' are directed to optical lens 1412', 1413', and 1414' respectively. The array of optical lenses 1411'-1414' form a rectangular array as shown in FIGS. 14a-b. When connectors 1400 and 1400' are mated, connector 1400' is aligned above connector 1400 so that light entering connector 1400 through input optical fibers 1401-1404, exits from connector 1400' through optical waveguides 1401'-1404' 180 degrees turned (U-turn, FIG. 14a) or 0 degrees turned (straight-through, FIG. 14b) from the input direction of the input optical fibers. In these configurations, due to the symmetry of the array of optical lenses in each connector, all of the lenses are aligned when the connectors are mating. Therefore, two identical connectors can be mated to align all of the lenses.

Figure 15:
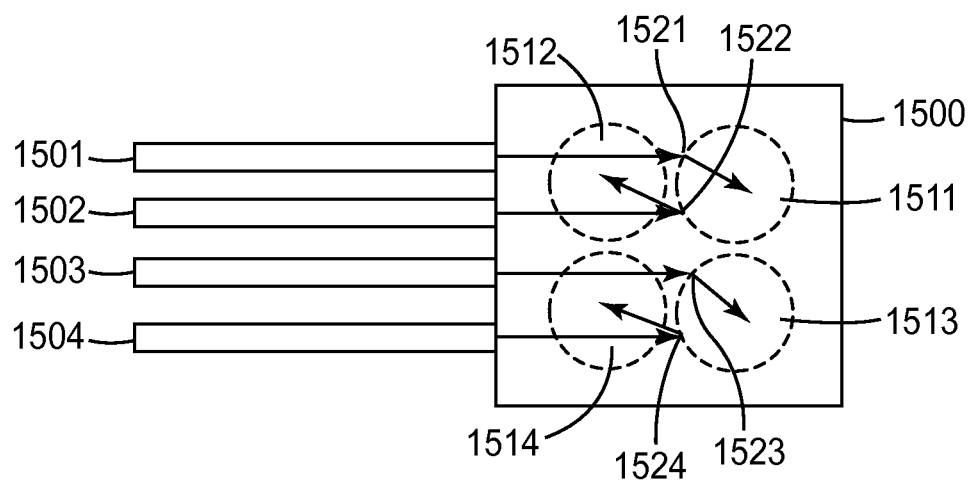
FIG. 15 is a schematic diagram of a provided connector having a rectangular array of optical lenses illustrating deflection of light both along and perpendicular to the incident light direction.

FIG. 15 is a schematic diagram of single, unmated, provided connector 1500 having a rectangular array of optical lenses 1511-1514, shown in the lens down orientation, and providing an example of angular deflection used to address a rectangular array of output lenses. In this embodiment, a plurality of input optical fibers 1501-1504 are arranged so that a central light ray of light exiting each optical fiber propagates along an incident direction in a same incident plane (the plane of the paper) as shown. Light from first input optical fiber 1501 is directed to optical lens 1511. Analogously, light from second, third, and fourth optical fibers 1502-1504 is directed to optical lenses 1512-1512 which are in a rectangular array as shown in FIG. 15. Inside connector 1500, light redirecting elements 1521-1524 redirect light rays inputted into connector 1500 from each of optical fibers 1501-1504 to optical lenses 1511-1514 respectively so that light from each optical fiber is redirected to a corresponding optical lens. The desired redirection of the light in a direction perpendicular to the fiber axes can be achieved by adjusting the angles of the redirecting elements 230a and 230b in FIG. 2 by, for example, rotating the elements around their long axes. Two identical connectors 1500 can be mated so that light from an optical lens on one connector enters a corresponding optical lens of the mated connector.

The following are an exemplary list of the embodiments of the present disclosure:

Item 1 is a connector comprising:
a waveguide alignment member for receiving and aligning a plurality of optical waveguides, such that central light rays of light exiting the plurality of optical waveguides propagate along a same incident direction in a same incident plane;
a light redirecting side comprising a plurality of segments forming a row of segments, the row being parallel to the incident plane, each segment corresponding to a different optical waveguide disposed and aligned at the waveguide alignment member and configured to receive light exiting the optical waveguide along the incident direction and redirect the received light along a redirected direction different from the incident direction, a first segment redirecting light along a first redirected direction, a second segment redirecting light along a second redirected direction different from the first redirected direction; and
a plurality of optical lenses forming two or more rows of optical lenses, each optical lens in the plurality of optical lenses corresponding to a different segment in the plurality of segments and configured to receive light from the segment along a corresponding redirected direction and transmit the received light as output light along an output direction, a divergence of the output light being different than a divergence of the light received by the optical lens.

Item 2 is the connector of item 1, wherein light exits an optical waveguide disposed and aligned at the waveguide alignment member as a diverging light, the central light ray of the exiting light being substantially at a center of the diverging light.

Item 3 is the connector of item 1, wherein a half divergence angle of light exiting an optical waveguide disposed and aligned at the waveguide alignment member is less than about 15 degrees.

Item 4 is the connector of item 1, wherein a half divergence angle of light exiting an optical waveguide disposed and aligned at the waveguide alignment member is less than about 14 degrees.

Item 5 is the connector of item 1, wherein a half divergence angle of light exiting an optical waveguide disposed and aligned at the waveguide alignment member is less than about 13 degrees.

Item 6 is the connector of item 1, wherein a half divergence angle of light exiting an optical waveguide disposed and aligned at the waveguide alignment member is less than about 12 degrees.

Item 7 is the connector of item 1, wherein a half divergence angle of light exiting an optical waveguide disposed and aligned at the waveguide alignment member is less than about 11 degrees.

Item 8 is the connector of item 1, wherein a half divergence angle of light received by a segment in the plurality of segments from a corresponding optical waveguide disposed and aligned at the waveguide alignment member is less than about 11 degrees.

Item 9 is the connector of item 1, wherein a half divergence angle of light received by a segment in the plurality of segments from a corresponding optical waveguide disposed and aligned at the waveguide alignment member is less than about 10 degrees.

Item 10 is the connector of item 1, wherein a half divergence angle of light received by a segment in the plurality of segments from a corresponding optical waveguide disposed and aligned at the waveguide alignment member is less than about 9 degrees.

Item 11 is the connector of item 1, wherein a half divergence angle of light received by a segment in the plurality of segments from a corresponding optical waveguide disposed and aligned at the waveguide alignment member is less than about 8 degrees.

Item 12 is the connector of item 1, wherein a half divergence angle of light received by a segment in the plurality of segments from a corresponding optical waveguide disposed and aligned at the waveguide alignment member is less than about 7 degrees.

Item 13 is the connector of item 1, wherein each optical waveguide in the plurality of optical waveguides disposed and aligned at the waveguide alignment member comprises an exit end from which light exits the optical waveguide, the waveguide alignment member being configured such that when the plurality of optical waveguides are disposed and aligned at the waveguide alignment member, the exit ends of the optical waveguides form a row parallel to the row of the segments in the plurality of segments.

Item 14 is the connector of item 13, wherein the exit end of each optical waveguide is substantially perpendicular to an optical axis of the optical waveguide.

Item 15 is the connector of item 13, wherein the exit end of at least one optical waveguide makes an oblique angle with an optical axis of the at least one optical waveguide.

Item 16 is the connector of item 1, wherein each optical waveguide in the plurality of optical waveguides disposed and aligned at the waveguide alignment member comprises an exit end from which light exits the optical waveguide, the waveguide alignment member being configured such that when the plurality of optical waveguides are disposed and aligned at the waveguide alignment member, the exit ends of the optical waveguides form a staggered arrangement in a same plane.

Item 17 is the connector of item 1, wherein the first segment makes an oblique angle with the second segment.

Item 18 is the connector of item 1, wherein the plurality of segments comprises alternating first and second segments, each first segment redirecting light along the first redirected direction, each second segment redirecting light along the second redirected direction.

Item 19 is the connector of item 1, wherein the light redirecting side is a unitary structure.

Item 20 is the connector of item 1, wherein a first lens in a first row of lenses in the plurality of optical lenses receives light from the first segment along the first redirected direction and a second lens in a second row of lenses in the plurality of optical lenses receives light from the second segment along the second redirected direction.

Item 21 is the connector of item 1, wherein when each optical lens in the plurality of optical lenses receives light from the corresponding segment, the received light is transmitted as output light along a same output direction.

Item 22 is the connector of item 1, wherein for at least some of the lenses in the plurality of optical lenses, the output direction is different than the redirected direction.

Item 23 is the connector of item 1, wherein the waveguide alignment member comprises at least one groove.

Item 24 is the connector of item 1, wherein the waveguide alignment member comprises a plurality of waveguide alignment elements, each waveguide alignment element being configured to receive and align a different optical waveguide.

Item 25 is the connector of item 24, wherein each waveguide alignment element comprises a groove.

Item 26 is the connector of item 1 comprising at least one alignment feature for receiving and aligning a plurality of optical waveguides integrated onto a common substrate.

Item 27 is the connector of item 1, wherein the waveguide alignment member comprises at least one alignment feature for receiving and aligning a ribbon comprising a plurality of optical waveguides.

Item 28 is the connector of item 1, wherein at least some of the segments in the plurality of segments are planar.

Item 29 is the connector of item 1, wherein at least some of the segments in the plurality of segments are curved.

Item 30 is the connector of item 1, wherein the output light from at least some optical lenses in the plurality of optical lenses is collimated light.

Item 31 is the connector of item 1, wherein the output light from at least some optical lenses in the plurality of optical lenses is converging light.

Item 32 is the connector of item 1, wherein the plurality of optical lenses comprises a plurality of first optical lenses disposed along a first row in a first plane and a plurality of second optical lenses disposed along a second row in a different second plane.

Item 33 is the connector of item 32, wherein the first plane makes an oblique angle with the second plane.

Item 34 is the connector of item 1, wherein the plurality of optical lenses comprises a plurality of first optical lenses disposed along a first row in a first plane and a plurality of second optical lenses disposed along a second row in the first plane.

Item 35 is the connector of item 1, wherein each optical lens in the plurality of optical lenses comprises a major curved surface for changing the divergence of light received by the optical lens from a corresponding segment in the plurality of segments, the major curved surface of at least one optical lens not having an axis of rotational symmetry.

Item 36 is the connector of item 1 further comprising a light redirecting member comprising:

an input side for receiving an incident light from an optical waveguide disposed and aligned at the waveguide alignment member along the incident direction and transmitting the received light as input light along an input direction;

the light redirecting side for receiving light from the input side along the input direction and redirecting the received light along the redirected direction;

an output side for receiving light from the light redirecting side and transmitting the received light as the output light; and the plurality of optical lenses.

Item 37 is the connector of item 36 being a unitary structure.

Item 38 is the connector of item 36, wherein as light from an optical waveguide disposed and aligned at the waveguide alignment member propagates along an optical path from the input side to the output side of the light redirecting member, an index of refraction of at least portions of the optical path is greater than one.

Item 39 is the connector of item 36, wherein as light from an optical waveguide disposed and aligned at the waveguide alignment member propagates along an optical path from the input side to the output side of the light redirecting member, an index of refraction of some portions of the optical path is greater than one and an index of refraction of some other portions of the optical path the refractive index of air.

Item 40 is the connector of item 36, wherein the light redirecting member is solid having a greater than one index of refraction between the input side and the output side.

Item 41 is the connector of item 36, wherein as light from an optical waveguide disposed and aligned at the waveguide alignment member propagates along an optical path from the input side to the output side of the light redirecting member, an index of refraction of the entire optical path is greater than one.

Item 42 is the connector of item 36, wherein at least some of the optical lenses in the plurality of optical lenses are disposed on one of the light redirecting and output sides of the light redirecting member.

Item 43 is the connector of item 36, wherein the optical lenses in the plurality of optical lenses are disposed on the output side of the light redirecting member.

Item 44 is the connector of item 36, wherein each optical lens in the plurality of optical lenses comprises a curved light receiving or outputting major surface.

Item 45 is a cable assembly comprising:
the connector of item 36; and
a plurality of optical waveguides received and aligned at the waveguide alignment member, the optical waveguides being permanently attached to the connector.

Item 46 is the cable assembly of item 45, wherein each optical waveguide in the plurality of waveguides is an optical fiber.

Item 47 is the cable assembly of item 45, wherein an index matching material optically couples at least one optical waveguide in the plurality of optical waveguides to the input side of the light redirecting member.

Item 48 is the connector of item 1, wherein each optical lens in the plurality of optical lenses comprises a light receiving major surface and an opposing light outputting major surface, at least one of the light receiving and light outputting major surfaces being curved.

Item 49 is the connector of item 1, wherein the optical lenses in the plurality of optical lenses are arranged in a square, rectangular, or hexagonal closely packed array.

Item 50 is the connector of item 1, wherein a diameter of each optical lens in the plurality of optical lenses is 150 microns.

Item 51 is the connector of item 1, wherein a diameter of each optical lens in the plurality of optical lenses is 180 microns.

Item 52 is the connector of item 1, wherein a diameter of each optical lens in the plurality of optical lenses is 200 microns.

Item 53 is the connector of item 1, wherein a diameter of each optical lens in the plurality of optical lenses is 250 microns.

Item 54 is the connector of item 1, wherein a diameter of each optical lens in the plurality of optical lenses is 300 microns.

Item 55 is the connector of item 1, wherein a diameter of each optical lens in the plurality of optical lenses is 350 microns.

Item 56 is the connector of item 1, wherein a diameter of each optical lens in the plurality of optical lenses is 400 microns.

Item 57 is the connector of item 1, wherein a diameter of each optical lens in the plurality of optical lenses is 450 microns.

Item 58 is the connector of item 1, wherein a diameter of each optical lens in the plurality of optical lenses is 500 microns.

Item 59 is the connector of item 1, wherein the segments in the plurality segments are separate individual segments.

Item 60 is the connector of item 59 further comprising a plurality of light redirecting elements, each light redirecting element corresponding to a different segment in the plurality of segments and to a different optical lens in the plurality of optical lenses and comprising:
an input side for receiving an incident light from an optical waveguide disposed and aligned at the waveguide alignment member along the incident direction and transmitting the received light as input light along an input direction;
the segment corresponding to the light redirecting element for receiving light from the input side along the input direction and redirecting the received light along the redirected direction;
an output side for receiving light from the segment and transmitting the received light as the output light; and
the optical lens corresponding to the segment and the light redirecting element.

Item 61 is a cable assembly comprising:
the connector of item 1; and
a plurality of optical waveguides received and aligned at the waveguide alignment member, the optical waveguides being permanently attached to the connector.

Item 62 is the cable assembly of item 61, wherein each optical waveguide in the plurality of waveguides is an optical fiber.

Item 63 is the cable assembly of item 61, wherein a core diameter of each optical waveguide in the plurality of optical waveguides is in a range from 2 to 20 microns.

Item 64 is the cable assembly of item 61, wherein a core diameter of each optical waveguide in the plurality of optical waveguides is in a range from 50 to 500 microns.

Item 65 is the cable assembly of item 61, wherein a core diameter of each optical waveguide in the plurality of optical waveguides is in a range from 100 to 400 microns.

Item 66 is the cable assembly of item 61, wherein a core diameter of each optical waveguide in the plurality of optical waveguides is in a range from 150 to 350 microns.

Item 67 is the cable assembly of item 61, wherein a core diameter of each optical waveguide in the plurality of optical waveguides is in a range from 200 to 300 microns.

Item 68 is the cable assembly of item 61, wherein at least one optical waveguide in the plurality of optical waveguides is a single mode optical waveguide for light wavelengths in a range from 0.35 microns to 2 microns.

Item 69 is the cable assembly of item 61, wherein at least one optical waveguide in the plurality of optical waveguides is a single mode optical waveguide for light wavelengths in a range from 1.3 microns to 1.65 microns.

Item 70 is the cable assembly of item 61, wherein at least one optical waveguide in the plurality of optical waveguides is a single mode optical waveguide for light wavelengths in a range from 1.31 microns to 1.55 microns.

Item 71 is the cable assembly of item 61, wherein at least one optical waveguide in the plurality of optical waveguides is a multimode optical waveguide for light wavelengths in a range from 0.35 microns to 2 microns.

Item 72 is the cable assembly of item 61, wherein at least one optical waveguide in the plurality of optical waveguides is a multimode optical waveguide for light wavelengths in a range from 0.75 microns to 1 micron.

Item 73 is the cable assembly of item 61, wherein at least one optical waveguide in the plurality of optical waveguides is a multimode optical waveguide for light wavelengths in a range from 0.83 microns to 0.88 microns.

Item 74 is a connector assembly comprising:
 a first connector of item 61; and
 a second connector of item 61, each optical waveguide in one connector corresponding to a different optical waveguide in the other connector, each optical lens in one connector corresponding to a different optical lens in the other connector, such that light exiting an optical waveguide in one connector enters the corresponding optical waveguide in the other connector after:
  being redirected by the corresponding segment in the connector toward the corresponding optical lens in the connector,
  being transmitted by the corresponding optical lens in the connector toward the corresponding optical lens in the other connector,
  being transmitted by the optical lens in the other connector toward the corresponding segment in the other connector, and
  being redirected by the corresponding segment in the other connector toward the corresponding optical waveguide in the other connector.

Item 75 is the connector assembly of item 74, wherein light propagating between an optical lens of one connector and the corresponding optical lens of the other connector is collimated.

Item 76 is the connector assembly of item 74, wherein light propagating between an optical lens of one connector and the corresponding optical lens of the other connector propagates through a focal spot.

Item 77 is a connector comprising a unitary light redirecting side configured to receive central light rays exiting a plurality of optical waveguides along a same incident direction in a same plane, the unitary light redirecting side comprising a plurality of segments forming a row of segments, the row being parallel to the plane, each segment corresponding to a different optical waveguide and configured to receive light exiting the optical waveguide along the incident direction and redirect the received light along a redirected direction different than the incident direction, at least one first redirected direction making an oblique angle with at least one second redirected direction.

Item 78 is a light redirecting member being unitary and comprising:
 a light input side through which light enters the light redirecting member;
 a light redirecting side for redirecting the entered light; and
 a light output side through which the redirected light exits the light redirecting member, the light redirecting side comprising first and second segments arranged along a first direction, the light output side comprising first and second optical lenses offset relative to each other along at least a second direction perpendicular to the first direction, the unitary light redirecting member being configured so that light redirected by the first and second segments exits the light redirecting member after propagating through the first and second optical lenses, respectively.

Item 79 is the light redirecting member of item 78, wherein the first and second optical lenses are offset relative to each other along the first and second directions.

Item 80 is the light redirecting member of item 78, wherein the first direction is parallel to the input side.

Item 81 is a light redirecting assembly being unitary and comprising:
 the light redirecting member of item 78; and
 a waveguide alignment member for receiving and aligning first and second optical waveguides, the unitary light redirecting assembly being configured so that light exiting the first and second optical waveguides enters the light redirecting member through the light input side, is redirected by the respective first and second segments, and exits the light redirecting member after propagating through the respective first and second optical lenses.

Item 82 a connector comprising:
 a waveguide alignment member for receiving and aligning a plurality of optical waveguides;
 a light redirecting member comprising:
  an input side for receiving a central light ray exiting an optical waveguide disposed and aligned at the waveguide alignment member along an incident direction and transmitting the received central light ray as input light along an input direction; and
  a light redirecting side for receiving the input light along the input direction and redirecting the received light as redirected light along a redirected direction different than the input direction; and
 a plurality of optical lenses, each optical lens in the plurality of optical lenses corresponding to a different optical waveguide disposed and aligned at the waveguide alignment member and configured to receive the redirected light corresponding to the optical waveguide and transmit the received light as output light along a same output direction, such that the light redirecting side redirects light received from first and second optical waveguides disposed and aligned at the waveguide alignment member as respective first and second redirected lights along respective first and second redirected directions, the first redirected direction being different than the second redirected direction.

Item 83 is a connector comprising:
 a waveguide alignment member for receiving and aligning a plurality of optical waveguides, such that central light rays of light exiting the plurality of optical waveguides propagate along at least two different first and second incident directions;
 a light redirecting side configured to receive light exiting an optical waveguide disposed and aligned at the waveguide alignment member along an incident direction and to redirect the received light along a redirected direction different from the incident direction; and
 a plurality of optical lenses forming two or more rows of optical lenses, each optical lens in the plurality of optical lenses corresponding to a different optical waveguide in a plurality of optical waveguides disposed and aligned at the waveguide alignment member and configured to receive light exiting the optical waveguide and redirected by the light redirecting side and transmit the received light as output light along an output direction, a divergence of the output light being different that a divergence of the light received by the optical lens.

Item 84 is the connector of item 83, wherein each optical lens in the plurality of optical lenses corresponds to a different optical waveguide in a plurality of optical waveguides disposed and aligned at the waveguide alignment member and is configured to receive light exiting the optical waveguide and redirected by the light redirecting side and transmit the received light as output light along a same output direction.

Item 85 is the connector of item 83, wherein the light redirecting side is planar.

Item 86 is the connector of item 83, wherein the light redirecting side is configured to receive light exiting an optical waveguide disposed and aligned at the waveguide alignment member along the first incident direction and to redirect the received light along a first redirected direction different from the first incident direction, and to receive light exiting an optical waveguide disposed and aligned at the waveguide alignment member along the second incident direction and to redirect the received light along a second redirected direction different from the second incident direction, the first and second redirecting directions being the same.

Item 87 is a connector comprising:
a plurality of optical waveguides, a central light ray of light exiting each optical waveguide propagating along an incident direction;
a light redirecting side receiving the central light ray exiting each optical waveguide along the incident direction and redirecting the received central light ray as a redirected central light ray along a redirected direction different from the incident direction; and
a plurality of optical lenses, each optical lens corresponding to a different optical waveguide in the plurality of optical waveguides and receiving the central light ray exiting the optical waveguide after being redirected by the light redirecting side along the redirected direction along a first direction and transmitting the received central light ray as output central light ray propagating along an output direction different from the first direction.

Item 88 is the connector of item 87, wherein the incident direction for the central light ray exiting a first optical waveguide in the plurality of optical waveguides is different from the incident direction for the central light ray exiting a different second optical waveguide in the plurality of optical waveguides.

Item 89 is the connector of item 87, wherein the central light rays of light exiting the optical waveguides in the plurality of optical waveguides propagate along the same incident direction.

Item 90 is the connector of item 87, wherein the first direction is parallel to the redirected direction.

Item 91 is a connector comprising:
a plurality of optical waveguides, a central light ray of light exiting each optical waveguide propagating along an incident direction in a same incident plane;
a light redirecting side receiving the central light ray exiting each optical waveguide along the incident direction and redirecting the received central light ray as a redirected central light ray propagating along a redirected direction different from the incident direction, the redirected direction corresponding to at least one optical waveguide in the plurality of optical waveguides being different than the redirected direction corresponding to at least one other optical waveguide in the plurality of optical waveguides; and
a rectangular array of optical lenses, each optical lens corresponding to a different optical waveguide in the plurality of optical waveguides and receiving the redirected central light ray corresponding to the optical waveguide and transmitting the received redirected central light ray as an output central light ray.

Item 92 is a connector comprising:
a waveguide alignment member for receiving and aligning a plurality of optical waveguides, such that central light rays of light exiting the plurality of optical waveguides propagate along at least two different incident directions;
a light redirecting member comprising a light redirecting side configured to receive light exiting the optical waveguides along the at least two different incident directions and to redirect light along at least two different redirected directions from the at least two different incident directions, each different redirected direction redirecting light from one of the at least two different incident directions; and
a rectangular array of optical lenses, each optical lens corresponding to a different optical waveguide in the plurality of optical waveguides and receiving the redirected central light ray corresponding to the optical waveguide and transmitting the received redirected central light ray as an output central light ray.

Item 93 is a structured surface having a unitary construction comprising a plurality of optical lenses, such that a central light ray of a first collimated light incident on a first optical lens in the plurality of optical lenses along an incident direction is deflected by the first optical lens along a first direction and a central light ray of a second collimated light incident on a different second optical lens in the plurality of optical lenses along the incident direction is deflected by the second optical lens along a second direction different than the first direction.

Item 94 is the structured surface of item 93, wherein the plurality of optical lenses cover at least 70% of the structured surface.

Item 95 is the structured surface of item 93, wherein the plurality of optical lenses cover at least 75% of the structured surface.

Item 96 is the structured surface of item 93, wherein the plurality of optical lenses cover at least 80% of the structured surface.

Item 97 is the structured surface of item 93, wherein the plurality of optical lenses cover at least 85% of the structured surface.

Item 98 is the structured surface of item 93, wherein the plurality of optical lenses cover at least 90% of the structured surface.

Item 99 is the structured surface of item 93, wherein the plurality of optical lenses cover at least 95% of the structured surface.

Item 100 is the structured surface of item 93, wherein the first and second central light rays are transmitted by the respective first and second optical lenses.

Item 101 is the structured surface of item 93, wherein the first and second central light rays are reflected by the respective first and second optical lenses.

Item 102 is a structured surface having a unitary construction and comprising a two-dimensional array of optical lenses, each optical lens having a focal spot on a same side of the structured surface, the focal spots of the optical lenses in the two-dimensional array of optical lenses lying on a same straight line.

Item 103 is the structured surface of item 102, wherein the plurality of optical lenses cover at least 70% of the structured surface.

Item 104 is the structured surface of item 102, wherein the plurality of optical lenses cover at least 75% of the structured surface.

Item 105 is the structured surface of item 102, wherein the plurality of optical lenses cover at least 80% of the structured surface.

Item 106 is the structured surface of item 102, wherein the plurality of optical lenses cover at least 85% of the structured surface.

Item 107 is the structured surface of item 102, wherein the plurality of optical lenses cover at least 90% of the structured surface.

Item 108 is the structured surface of item 102, wherein the plurality of optical lenses cover at least 95% of the structured surface.

Item 109 is the connector of any of items 1 wherein a beam diameter of the output light transmitted by the optical lens is greater than a core diameter of the corresponding optical waveguide in the plurality of optical waveguides.

Item 110 is the connector of item 45, wherein a beam diameter of the output light transmitted by the optical lens is greater than a pitch of the plurality of the optical waveguides.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A connector comprising:
   a waveguide alignment member for receiving and aligning a plurality of optical waveguides, such that central light rays of light exiting the plurality of optical waveguides propagate along a same incident direction in a same incident plane;
   a light redirecting side comprising a plurality of segments forming a row of segments, the row being parallel to the incident plane, each segment corresponding to a different optical waveguide disposed and aligned at the waveguide alignment member and configured to receive light exiting the optical waveguide along the incident direction and redirect the received light along a redirected direction different from the incident direction, a first segment redirecting light along a first redirected direction, a second segment redirecting light along a second redirected direction different from the first redirected direction; and
   a plurality of optical lenses forming two or more rows of optical lenses, each optical lens in the plurality of optical lenses corresponding to a different segment in the plurality of segments and configured to receive light from the segment along a corresponding redirected direction and transmit the received light as collimated output light along a same output direction.

2. The connector of claim 1, wherein the plurality of segments comprises alternating first and second segments, each first segment redirecting light along the first redirected direction, each second segment redirecting light along the second redirected direction.

3. The connector of claim 1, wherein a first lens in a first row of lenses in the plurality of optical lenses receives light from the first segment along the first redirected direction and a second lens in a second row of lenses in the plurality of optical lenses receives light from the second segment along the second redirected direction.

4. The connector of claim 1, wherein the plurality of optical lenses comprises a plurality of first optical lenses disposed along a first row in a first plane and a plurality of second optical lenses disposed along a second row in a different second plane.

5. The connector of claim 1, wherein each optical lens in the plurality of optical lenses comprises a major curved surface for collimating light received by the optical lens from a corresponding segment in the plurality of segments, the major curved surface of at least one optical lens not having an axis of rotational symmetry.

6. The connector of claim 1 further comprising a light redirecting member comprising:
   an input side for receiving an incident light from an optical waveguide disposed and aligned at the waveguide alignment member along the incident direction and transmitting the received light as input light along an input direction;
   the light redirecting side for receiving light from the input side along the input direction and redirecting the received light along the redirected direction;
   an output side for receiving light from the light redirecting side and transmitting the received light as the output light; and
   the plurality of optical lenses.

7. The connector of claim 6 being a unitary structure.

8. The connector of claim 6, wherein as light from an optical waveguide disposed and aligned at the waveguide alignment member propagates along an optical path from the input side to the output side of the light redirecting member, an index of refraction of at least portions of the optical path is greater than one.

9. The connector of claim 1, wherein the segments in the plurality segments are separate individual segments.

10. The connector of claim 9 further comprising a plurality of light redirecting elements, each light redirecting element corresponding to a different segment in the plurality of segments and to a different optical lens in the plurality of optical lenses and comprising:
    an input side for receiving an incident light from an optical waveguide disposed and aligned at the waveguide alignment member along the incident direction and transmitting the received light as input light along an input direction;
    the segment corresponding to the light redirecting element for receiving light from the input side along the input direction and redirecting the received light along the redirected direction;
    an output side for receiving light from the segment and transmitting the received light as the output light; and
    the optical lens corresponding to the segment and the light redirecting element.

11. The connector of claim 1, wherein the first segment makes an oblique angle with the second segment.

12. A connector assembly comprising:
    a first connector of claim 1; and
    a second connector of claim 1, each optical waveguide in one connector corresponding to a different optical waveguide in the other connector, each optical lens in one connector corresponding to a different optical lens in the other connector, such that light exiting an optical waveguide in one connector enters the corresponding optical waveguide in the other connecter after:
        being redirected by the corresponding segment in the connector toward the corresponding optical lens in the connector, being transmitted by the corresponding optical lens in the connector toward the corresponding optical lens in the other connector, being transmitted by the optical lens in the other connector toward the corresponding segment in the other connector, and being redirected by the corresponding segment in the other connector toward the corresponding optical waveguide in the other connector.

13. A light redirecting member being unitary and comprising:

a light input side through which light enters the light redirecting member;

a light redirecting side for redirecting the entered light; and a light output side through which the redirected light exits the light redirecting member, the light redirecting side comprising a plurality of segments, the plurality of segments including first and second segments arranged along a first direction, the light output side comprising first and second optical lenses offset relative to each other along at least a second direction perpendicular to the first direction, the unitary light redirecting member being configured so that light is redirected by the first and second segments along at least two different directions and exits the light redirecting member in a same direction as collimated output light after propagating through the first and second optical lenses, respectively, the light propagating through each of the first and second optical lenses having a beam diameter greater than a pitch of the plurality of segments.

14. The light redirecting member of claim 13, wherein the first and second optical lenses are offset relative to each other along the first and second directions.

15. The light redirecting member of claim 13, wherein the first direction is parallel to the input side.

16. A light redirecting assembly being unitary and comprising:

the light redirecting member of claim 13; and a waveguide alignment member for receiving and aligning first and second optical waveguides, the unitary light redirecting assembly being configured so that light exiting the first and second optical waveguides enters the light redirecting member through the light input side, is redirected by the respective first and second segments, and exits the light redirecting member after propagating through the respective first and second optical lenses.

17. A connector comprising:

a waveguide alignment member for receiving and aligning a plurality of optical waveguides, such that central light rays of light exiting the plurality of optical waveguides propagate along different alternating first and second incident directions;

a light redirecting side configured to receive light exiting an optical waveguide disposed and aligned at the waveguide alignment member along an incident direction and to redirect the received light along a redirected direction different from the incident direction; and a plurality of optical lenses forming two or more rows of optical lenses, each optical lens in the plurality of optical lenses corresponding to a different optical waveguide in a plurality of optical waveguides disposed and aligned at the waveguide alignment member and configured to receive light exiting the optical waveguide and redirected by the light redirecting side and transmit the received light as collimated output light along a same output direction.

18. The connector of claim 17, wherein the light redirecting side is planar.

19. The connector of claim 17, wherein the light redirecting side is configured to receive light exiting an optical waveguide disposed and aligned at the waveguide alignment member along the first incident direction and to redirect the received light along a first redirected direction different from the first incident direction, and to receive light exiting an optical waveguide disposed and aligned at the waveguide alignment member along the second incident direction and to redirect the received light along a second redirected direction different from the second incident direction, the first and second redirected directions being the same.

20. The connector of claim 17, wherein a beam diameter of the output light is greater than a pitch of the plurality of optical waveguides.

21. The connector of claim 17 being a unitary structure.

* * * * *